US009771862B2

(12) United States Patent
Palazzolo et al.

(10) Patent No.: US 9,771,862 B2
(45) Date of Patent: Sep. 26, 2017

(54) ASSEMBLY FOR A V-ENGINE

(71) Applicant: Ford Global Technologies, LLC, Dearborn, MI (US)

(72) Inventors: Christopher K. Palazzolo, Ann Arbor, MI (US); Darren Sipila, Chesterfield, MI (US); Leigh Barretto, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 133 days.

(21) Appl. No.: 14/741,040

(22) Filed: Jun. 16, 2015

(65) Prior Publication Data

US 2015/0285138 A1   Oct. 8, 2015

Related U.S. Application Data

(63) Continuation-in-part of application No. 13/270,131, filed on Oct. 10, 2011, now Pat. No. 9,057,340.

(Continued)

(51) Int. Cl.

| | |
|---|---|
| *F02B 75/22* | (2006.01) |
| *F02B 67/00* | (2006.01) |
| *F02B 77/04* | (2006.01) |
| *F02F 1/42* | (2006.01) |
| *F02F 7/00* | (2006.01) |
| *F01M 11/02* | (2006.01) |

(Continued)

(52) U.S. Cl.
CPC ............ *F02B 75/22* (2013.01); *F01M 11/02* (2013.01); *F02F 7/0012* (2013.01); *F01M 2011/033* (2013.01); *F02B 2075/025* (2013.01); *F02F 7/0053* (2013.01)

(58) Field of Classification Search
CPC .. F02B 75/243; F02B 75/22; F02B 2075/025; F02F 7/0053; F02F 2007/0056; F02F 7/0012; F16C 9/02; F16C 9/03; F16C 9/04; F16C 9/06; F01M 11/02; F01M 2011/033
USPC .............................. 123/195 A, 198 E, 195 R
See application file for complete search history.

(56) References Cited

U.S. PATENT DOCUMENTS 3,263,402 A    8/1966  Lindamood et al.
4,059,085 A *  11/1977 Mansfield ................. F02B 7/00
                                                    123/195 R (Continued)

FOREIGN PATENT DOCUMENTS

EP          0274393 B1    7/1988
EP          0291358 B1    11/1988
(Continued)

*Primary Examiner* — Syed O Hasan
(74) *Attorney, Agent, or Firm* — Julia Voutyras; McCoy Russell LLP

(57) ABSTRACT

A cylinder block assembly for a V-engine is provided. In one example, the cylinder block assembly includes a cylinder block including a plurality of cylinders divided into a first cylinder bank and a second cylinder bank, a valley positioned between the first and second cylinder banks, and a plurality of crankshaft supports. The cylinder block assembly further includes a structural frame including an interior surface coupled to the plurality of crankshaft supports and two top surfaces arranged above the interior surface and on opposing sides of the assembly, where each top surface is coupled to the cylinder block above a top of the plurality of crankshaft supports.

20 Claims, 13 Drawing Sheets

Related U.S. Application Data

(60) Provisional application No. 61/428,119, filed on Dec. 29, 2010.

(51) Int. Cl.
   *F02B 75/02* (2006.01)
   *F01M 11/03* (2006.01)

(56) References Cited

U.S. PATENT DOCUMENTS

| | | | |
|---|---|---|---|
| 4,237,847 A | 12/1980 | Baugh et al. | |
| 4,753,201 A * | 6/1988 | Fukuo | F01M 11/02 123/195 C |
| 4,790,287 A | 12/1988 | Sakurai et al. | |
| 5,190,005 A | 3/1993 | Saito et al. | |
| 5,222,467 A * | 6/1993 | Sasada | F02F 7/0053 123/195 H |
| 5,247,915 A | 9/1993 | Sasada et al. | |
| 5,357,922 A | 10/1994 | Han | |
| 6,070,562 A | 6/2000 | Van Bezeij | |
| 6,231,240 B1 * | 5/2001 | Brenker | F02F 7/0053 123/195 R |
| 6,684,845 B2 | 2/2004 | Cho | |
| 7,367,294 B2 | 5/2008 | Rozario et al. | |
| 7,419,554 B2 | 9/2008 | Eriksson et al. | |
| 7,509,936 B2 | 3/2009 | Weinzierl et al. | |
| 8,833,328 B2 | 9/2014 | Palazzolo et al. | |
| 8,887,703 B2 | 11/2014 | Valencia et al. | |
| 8,919,301 B2 | 12/2014 | Palazzolo et al. | |
| 9,074,553 B2 | 7/2015 | Palazzolo et al. | |
| 2002/0020368 A1 | 2/2002 | Fujimoto et al. | |
| 2005/0011478 A1 * | 1/2005 | Neal | F01L 9/021 123/90.12 |
| 2005/0087154 A1 | 4/2005 | Hayman et al. | |
| 2007/0137606 A1 | 6/2007 | Takahashi et al. | |
| 2009/0041398 A1 | 2/2009 | Tanaka et al. | |
| 2010/0050977 A1 | 3/2010 | Park | |
| 2010/0101514 A1 | 4/2010 | Hirano et al. | |
| 2012/0167844 A1 | 7/2012 | Palazzolo et al. | |
| 2012/0167855 A1 | 7/2012 | Palazzolo et al. | |

FOREIGN PATENT DOCUMENTS

| | | |
|---|---|---|
| EP | 0368478 B1 | 5/1990 |
| EP | 0411319 B1 | 2/1991 |
| EP | 0476506 B1 | 3/1992 |
| EP | 0476706 B1 | 3/1992 |
| EP | 0837236 B1 | 4/1998 |
| EP | 1160438 A2 | 12/2001 |
| EP | 1298295 B1 | 4/2003 |
| EP | 1361355 A1 | 11/2003 |
| EP | 1482135 A2 | 12/2004 |
| EP | 2063085 B1 | 5/2009 |
| GB | 712869 | 8/1954 |
| JP | 5019543 A | 1/1993 |
| JP | 5263653 A | 10/1993 |
| JP | 5263654 A | 10/1993 |
| JP | 5321760 A | 12/1993 |
| JP | 8200154 A | 8/1996 |
| JP | 9195870 A | 7/1997 |
| JP | 10054298 A | 2/1998 |
| JP | 10061485 A | 3/1998 |
| JP | 10196451 A | 7/1998 |
| JP | 10266892 A | 10/1998 |
| JP | 2001317534 A | 11/2001 |
| JP | 2007064081 A | 3/2007 |
| JP | 2007239497 A | 9/2007 |

* cited by examiner

FIG. 4
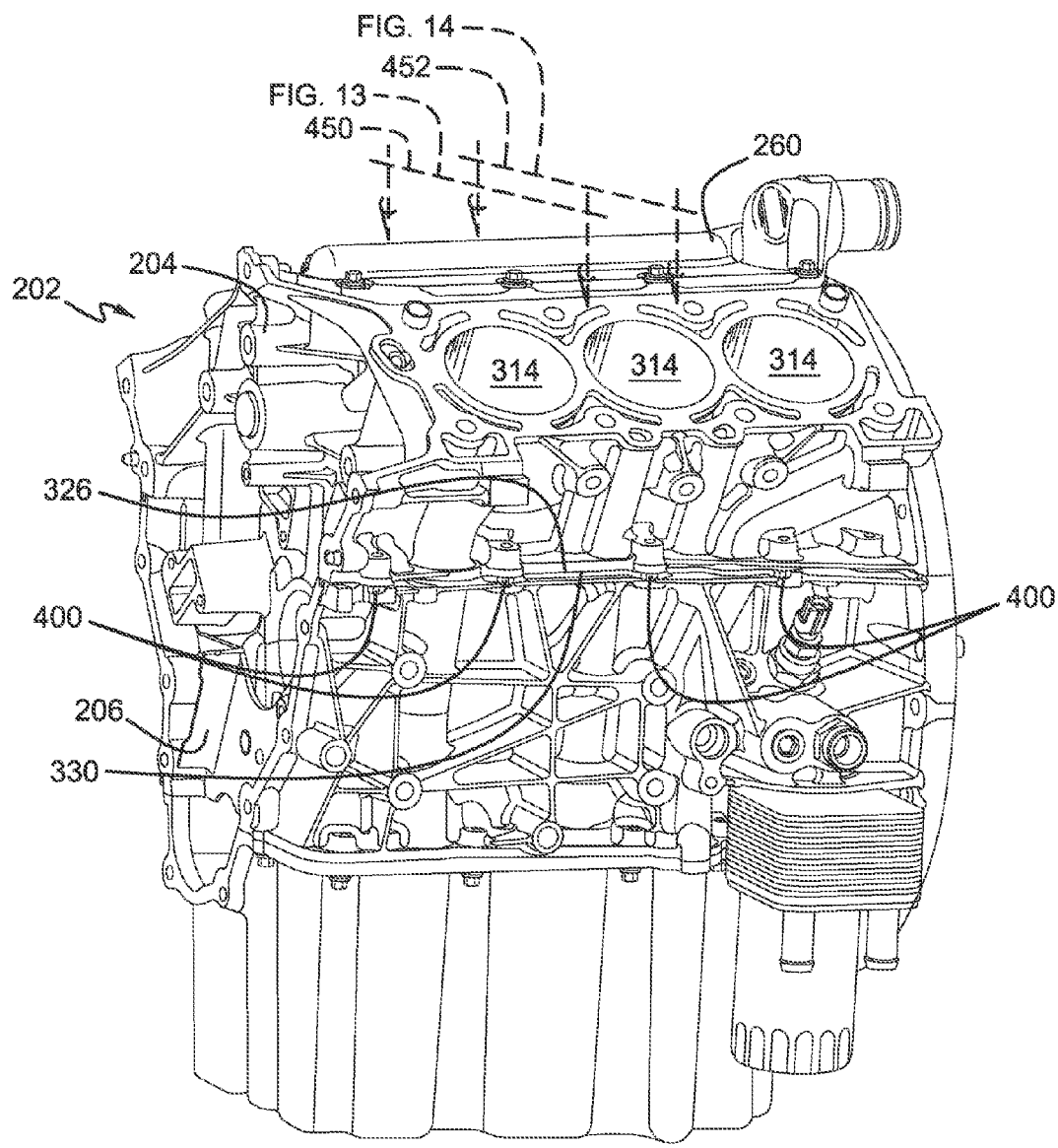
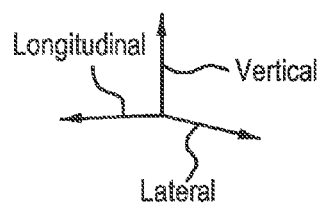

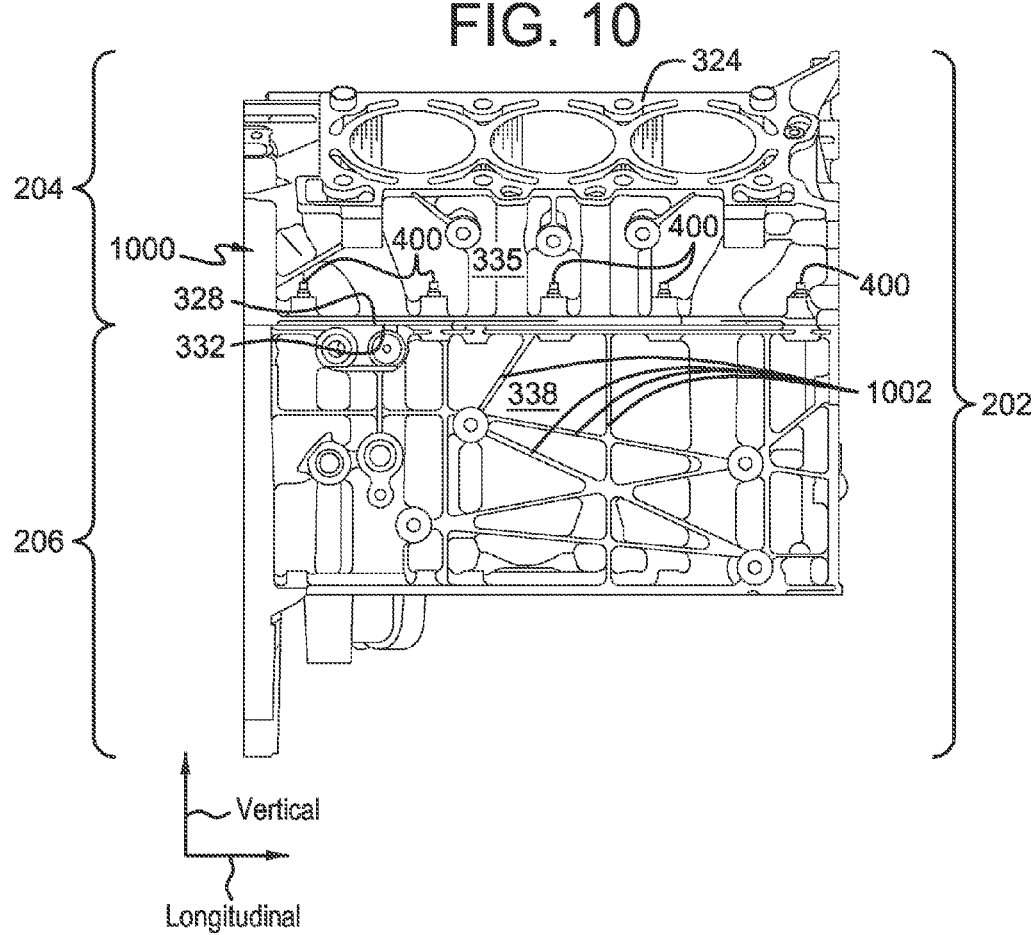

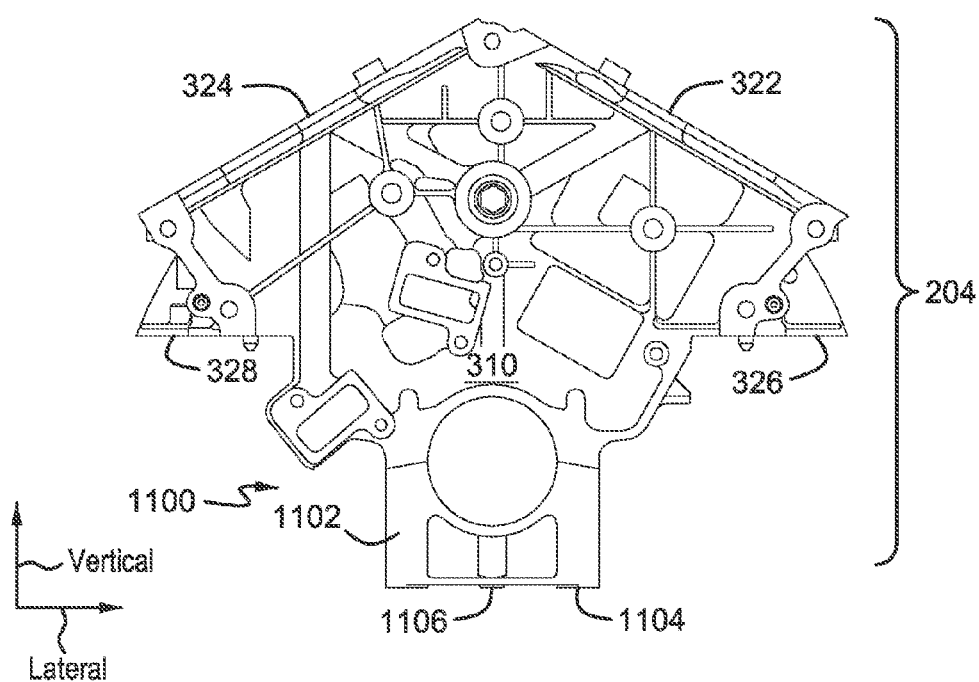
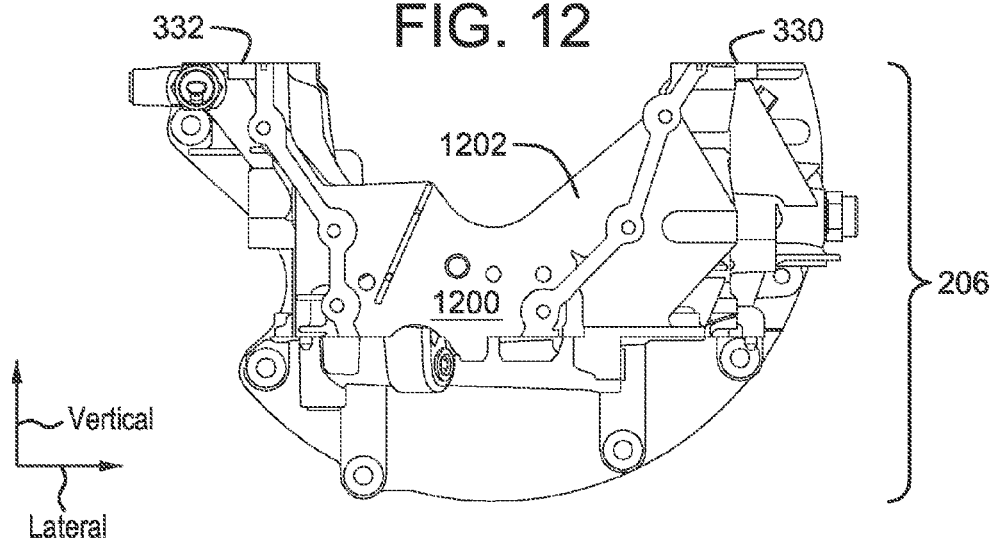

FIG. 17
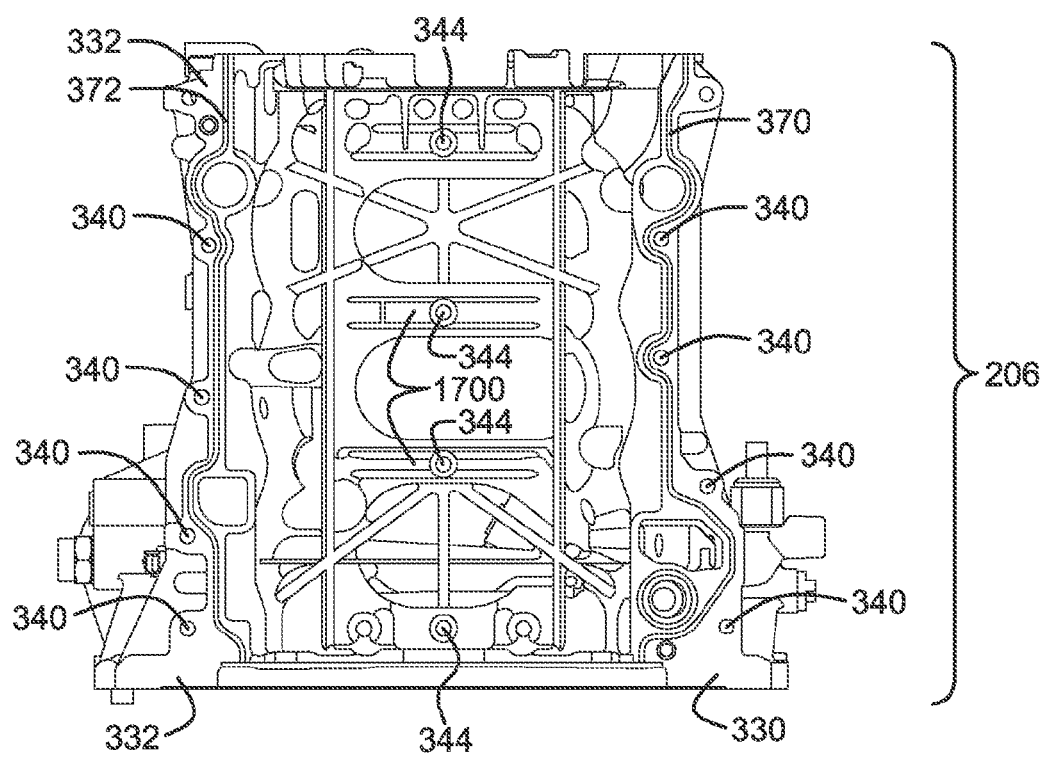
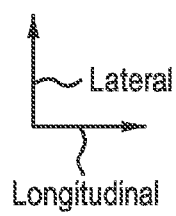

ASSEMBLY FOR A V-ENGINE

CROSS-REFERENCE TO RELATED APPLICATIONS

This application is a continuation-in-part of U.S. patent application Ser. No. 13/270,131, entitled "CYLINDER BLOCK ASSEMBLY," filed Oct. 10, 2011, now U.S. Pat. No. 9,057,340, which claims priority to U.S. Provisional Patent Application No. 61/428,119, entitled "CYLINDER BLOCK ASSEMBLY," filed Dec. 29, 2010, the entire contents of each of which are hereby incorporated by reference for all purposes.

BACKGROUND/SUMMARY

Internal combustion engines are continually being refined to decrease noise, vibration, and harshness (NVH) as well as increase the structural integrity of the connection between various components. Components coupled to the cylinder block, such as structural frame, may experience a large amount of stress during engine operation. Specifically vibrations may be transferred to the structural frame from the engine during operation.

Therefore, ladder frames have been developed which are integrally molded with the cylinder block. For example, in U.S. Pat. No. 5,357,922 a cylinder block assembly is disclosed. The cylinder block assembly includes a skirt portion and a ladder frame integrally molded with a portion of the cylinder block. When the ladder frame is integrally molded with a portion of the cylinder block, noise vibration and harshness (NVH) in the engine may be reduced.

However, the inventors herein have recognized various drawbacks with the cylinder block assembly disclosed in U.S. Pat. No. 5,357,922. For example, the crankshaft as well as other engine components may be difficult to install when the cylinder block and ladder frame are integrally molded. Moreover, integrally molding the cylinder block and ladder frame may restrict the shape of the ladder frame as well as decrease the amount of machining that can be performed on the ladder frame after molding.

The inventors herein have recognized the challenges of NVH reduction as well as strength to weight tradeoffs within a cylinder block assembly and have provided a cylinder block assembly for a V-engine comprising: a cylinder block including a plurality of cylinders divided into a first cylinder bank and a second cylinder bank, a valley positioned between the first and second cylinder banks, and a plurality of crankshaft supports; and a structural frame including an interior surface coupled to the plurality of crankshaft supports and two top surfaces arranged above the interior surface and on opposing sides of the assembly, where each top surface is coupled to the cylinder block above a top of the plurality of crankshaft supports.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE FIGURES

FIG. 4 shows an assembled view of the cylinder block assembly shown in FIG. 3.

FIG. 10 shows a right side view of the cylinder block assembly shown in FIG. 4.

FIG. 11 shows front end view of the cylinder block shown in FIG. 3.

FIG. 12 shows front end view of the structural frame shown in FIG. 3.

FIG. 17 shows a top view of the structural frame shown in FIG. 3.

FIGS. 3-19 are drawn approximately to scale.

DETAILED DESCRIPTION

Figure 1:
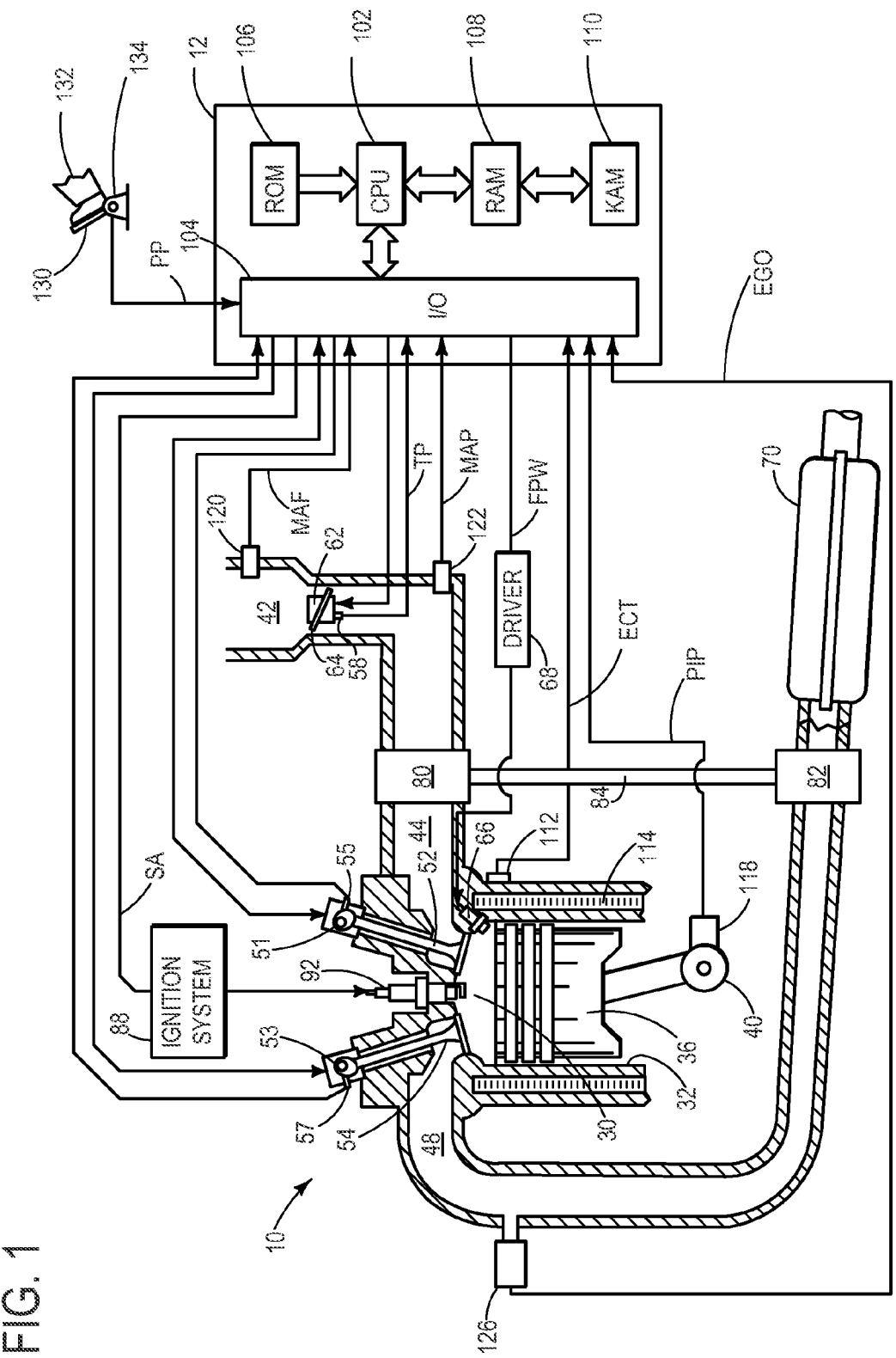
FIG. 1 shows a schematic depiction of an internal combustion engine.

Referring to FIG. 1, internal combustion engine 10, comprising a plurality of cylinders, one cylinder of which is shown in FIG. 1, is controlled by electronic engine controller 12. Engine 10 includes cylinder 30 and cylinder walls 32 with piston 36 positioned therein and connected to crankshaft 40. Cylinder 30 may also be referred to as a combustion chamber. Cylinder 30 is shown communicating with intake manifold 44 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Intake manifold 44 is also shown intermediate of intake valve 52 and air intake zip tube 42. Fuel is delivered to fuel injector 66 by a fuel system (not shown) including a fuel tank, fuel pump, and fuel rail (not shown). The engine 10 of FIG. 1 is configured such that the fuel is injected directly into the engine cylinder, which is known to those skilled in the art as direct injection. Fuel injector 66 is supplied operating current from driver 68 which responds to controller 12. In addition, intake manifold 44 is shown communicating with optional electronic throttle 62 with throttle plate 64. In one example, a low pressure direct injection system may be used, where fuel pressure can be raised to approximately 20-30 bar. Alternatively, a high pressure, dual stage, fuel system may be used to generate higher fuel pressures.

Additionally or alternatively a fuel injector may be positioned upstream of intake valve 52 and configured to inject fuel into the intake manifold, which is known to those skilled in the art as port injection.

Distributorless ignition system 88 provides an ignition spark to cylinder 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, Hall effect sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into cylinder 30 via intake manifold 44, and piston 36 moves to the bottom of the cylinder so as to increase the volume within cylinder 30. The position at which piston 36 is near the bottom of the cylinder and at the end of its stroke (e.g., when cylinder 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within cylinder 30. The point at which piston 36 is at the end of its stroke and closest to the cylinder head (e.g., when cylinder 30 is at its smallest volume) is typically referred to by those of skill in the art as top dead center (TDC). In a process hereinafter referred to as injection, fuel is introduced into the cylinder. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Engine 10 may further include a turbocharger having a compressor 80 positioned in intake manifold 44 coupled to a turbine 82 positioned in exhaust manifold 48. A driveshaft 84 may couple the compressor to the turbine. Thus, the turbocharger may include compressor 80, turbine 82, and driveshaft 84. Exhaust gases may be directed through the turbine, driving a rotor assembly which in turn rotates the driveshaft. In turn the driveshaft rotates an impeller included in the compressor configured to increase the density of the air delivered to cylinder 30. In this way, the power output of the engine may be increased. In other examples, the compressor may be mechanically driven and turbine 82 may not be included in the engine. Further, in other examples, engine 10 may be naturally aspirated.

Figure 2:
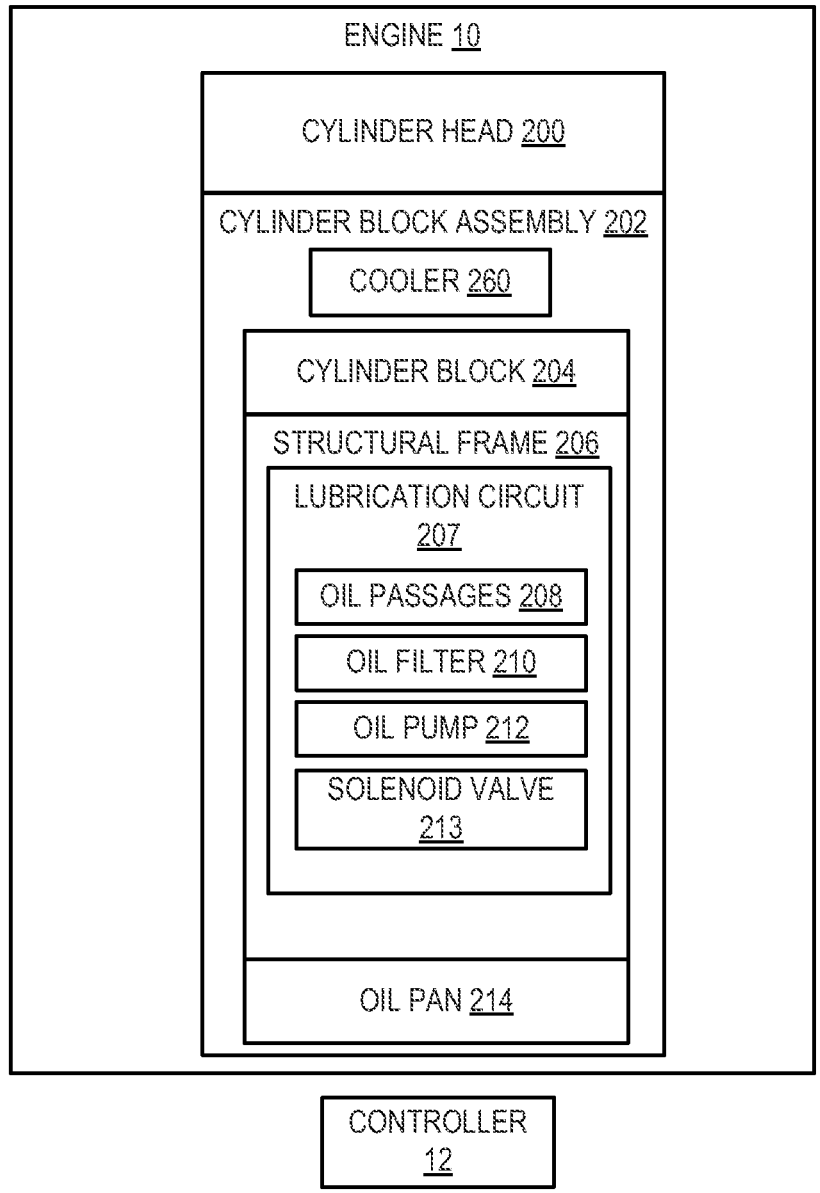
FIG. 2 shows another schematic depiction of the internal combustion engine shown in FIG. 1 including a cylinder block assembly.

Referring to FIG. 2, it shows an example schematic depiction of engine 10. Engine 10 includes a cylinder head 200 coupled to a cylinder block assembly 202. It will be appreciated that the engine may further include various components for attaching the cylinder head to the cylinder block assembly such as a head gasket (not shown), bolts or other suitable attachment apparatuses, etc.

The cylinder head and cylinder block assembly may each comprise at least one cylinder. As discussed above with regard to FIG. 1, engine 10 may include additional components configured to perform combustion in the at least one cylinder.

The cylinder block assembly may include a cylinder block 204 coupled to a structural frame 206. The structural frame may include a lubrication circuit 207 integrated therein. The lubrication circuit may include oil passages 208, oil filter 210, oil pump 212, and solenoid valve 213. The oil passages may be configured to provide lubrication to various engine components such as the crankshaft and crankshaft bearings. The oil filter may be coupled to an oil passage and configured to remove unwanted particulates from the oil passage. Moreover, the oil pump may also be coupled to an oil passage included in oil passages 208 and configured to increase the pressure in the lubrication circuit 207. It will be appreciated that additional integrated components may be included in structural frame 206. For example, the integrated components may include balance shafts, block heaters, actuators, and sensors.

In one example, an oil pan 214 may be coupled to structural frame 206. The oil pan may be included in a lubrication circuit. Oil pump 212 may also be coupled to structural frame 206 via bolts or other suitable fasteners. Oil pump 212 may be configured to circulate oil from oil pan 214 into oil passages 208. Thus, the oil pump may include a pick-up disposed in the oil pan as discussed in greater detail herein with regard to FIG. 3. It will be appreciated that oil passages 208 may be fluidly coupled to oil passages included in cylinder head 200.

Engine 10 may further include a cooler 260 integrated into cylinder block assembly 202. Cooler 260 may be configured to remove heat from lubrication circuit 207. Cooler 260 may be an oil cooler.

Figure 3:
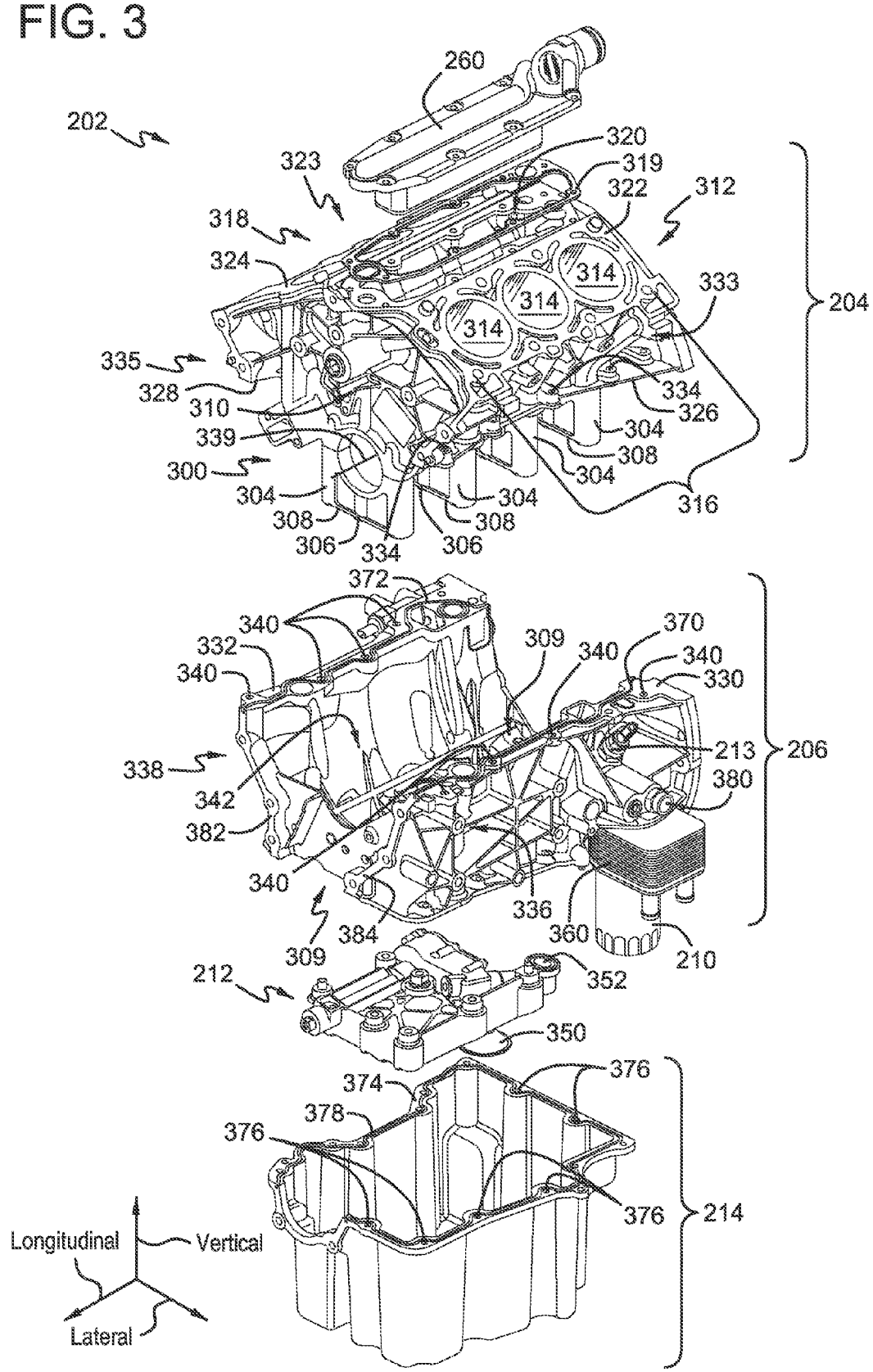
FIG. 3 shows an exploded perspective view of an example cylinder block assembly.

Referring to FIG. 3, it shows an exploded perspective view of an example cylinder block assembly 202. As depicted, cylinder block assembly 202 includes cylinder block 204 positioned vertically above the structural frame 206. Pump 212 and oil pan 214 are positioned vertically below the structural frame 206. Directional vectors (i.e., the longitudinal, vertical, and lateral vectors) are provided for conceptual understanding. However, it will be appreciated that the cylinder block assembly may be positioned in a number of orientations when included in a vehicle.

The cylinder block 204 further includes a plurality of crankshaft supports 300 positioned at the bottom of the cylinder block 204 and configured to structurally support a crankshaft (not shown). The plurality of crankshaft supports 300 may be referred to as a group of crankshaft supports. In the depicted embodiment there are four crankshaft supports 300. However, in other examples, the cylinder block 204 may include two crankshaft supports. Further still in other examples the cylinder block 204 may include one crankshaft support 300. The crankshaft supports 300 may each include a bearing cap 304. The bearing caps are configured to receive a crankshaft bearing. Thus, the crankshaft supports form openings that are configured to receive crankshaft bearing (not shown) that are configured to enable rotation of a crankshaft (not shown). It will be appreciated that the crankshaft may include various components such as counterweights, journals, crankpin journals, etc. The crankpin journals may each be coupled to a piston via a connecting rod. In this way, combustion in the cylinders may be used to rotate the crankshaft.

The bearing caps 304 may each include a structural frame attachment recess 306. In other examples, a structural frame attachment feature other than a recess may be provided (e.g., a protrusion). In the depicted example, each bearing cap 304 includes only a single attachment recess 306 centrally positioned with regard to the lateral edges of the bearing cap 304. However, in other examples each bearing cap 304 may include a plurality of attachment recesses positioned between fasteners coupling bearing cap 304 to the engine block. In another example, each bearing cap may include a centrally positioned structural frame attachment recess and two peripheral attachment recesses. It will be appreciated that when a single centrally positioned structural frame attachment recess is provided, the manufacturing process may be simplified while increasing the strength of the connection between the structural frame 206 and the cylinder block 204. Thus, the structural integrity of the cylinder block assembly 202 may be increased when a centrally positioned attachment recess is utilized. Additionally, the NVH in the engine 10 may be reduced when centrally positioned structural frame attachment recesses 306 are utilized. Specifically, the NVH transferred from the bearing caps 304 to the structural frame 206 may be reduced. The structural frame attachment recesses traverse partially through the bearing cap 304. The structural frame attachment recesses 306 are shown in greater detail herein with regard to FIG. 19.

Figure 13:
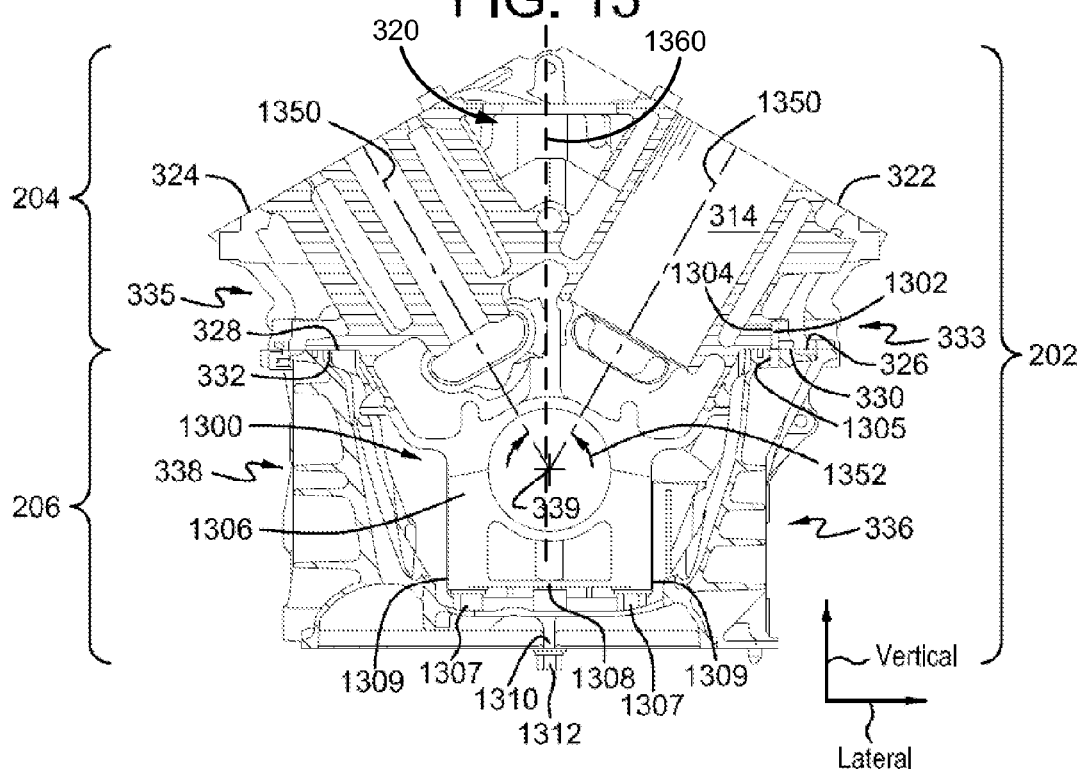
FIGS. 13 and 14 show cut-away views of the cylinder block assembly shown in FIG. 4.

The structural frame attachment recesses may be configured to receive a fastener such as a bolt or other suitable attachment apparatus for coupling the structural frame 206 to the cylinder block 204, discussed in greater detail herein with regard to FIGS. 4 and 13. In this way, the structural frame 206 is coupled to the cylinder block 204 via the bearing caps 304. Each structural frame attachment recess 306 extends vertically into the crankshaft supports 300 from a bottom surface 308 of each the bearing caps. Moreover, each structural frame attachment recess is positioned at the midpoint between the lateral edges of the bottom surface 308, shown in FIG. 19 and described in greater detail herein. Additionally, each structural frame attachment recess 306 is arranged perpendicularly to the centerline 339. However in other examples, the structural frame attachment recesses may be positioned in another suitable location. Still further, in some examples the structural frame attachment recesses may have an alternate geometric configuration and/or orientation.

As shown, crankshaft supports 300 are formed out of one continuous piece of material. In other words, the crankshaft supports 300 are manufactured via a single casting. Further in the depicted example, the cylinder block 204 is a one piece engine cylinder block constructed in a single casting. The crankshaft supports may be cracked or otherwise divided from the cylinder block 204 after casting so that a crankshaft (not shown) may be installed. After the crankshaft is properly positioned, the pieces of the crankshaft supports may be subsequently fastened to the cylinder block after being divided from the cylinder block. In this way, the structural integrity as well as the precision of the mated interface of the crankshaft supports may be increased when compared to other cylinder block designs which may couple separately constructed (e.g., cast) upper and lower pieces of the cylinder block to form the bearing cap. Moreover, NVH may also be reduced in the cylinder block assembly when the crankshaft supports are constructed out of a single piece of material.

Cylinder block 204 further includes an exterior front wall 310. The exterior front wall 310 is shown in greater detail in FIG. 11. Likewise, cylinder block 204 further includes an exterior rear wall 312, show in FIG. 6. The exterior front wall 310 includes a first outermost crankshaft support 1100, shown in FIG. 11 and discussed in greater detail herein. However, in the example in which the cylinder block comprises two crankshaft supports, the exterior front wall includes a first crankshaft support. The exterior rear wall 312 includes a second outermost crankshaft support 600, discussed in greater detail herein with regard to FIG. 6.

Continuing with FIG. 3, as depicted the cylinder block 204 includes a plurality of cylinders 314. However, in other examples the cylinder block 204 may include a single cylinder. It will be appreciated that cylinder 30 shown in FIG. 1 may be included in the plurality of cylinders 314. The plurality of cylinders 314 may be conceptually divided into a first and a second cylinder bank (316 and 318). Cylinder bank 318 is shown in greater detail herein with regard to FIG. 18. As shown, the engine may be in a V configuration (e.g., also know as a V-engine) in which opposing cylinders in each of the respective cylinder banks are positioned at a non-straight angle with respect to one another. In this way, the cylinders are arranged in a V. However, other cylinder configurations are possible in other examples. A valley 320 may be positioned between the first and second cylinder banks (316 and 318) in the cylinder block 204. Cooler 260 may be positioned in the valley when the cylinder block assembly 202 is assembled. When positioned within the valley, the cooler 260, extends into an interior of the valley 320. For example, the cooler 260 extends from a top, outer surface of the cylinder block 204 and downward into the interior of the valley 320, in the space that separates the first and second cylinder banks. A gasket 319 may be positioned between the cooler 260 and the cylinder block 204. As shown in FIG. 3, the gasket is position on the top, outer surface of the cylinder block 204, at a peak positioned between the angled cylinder block engaging surfaces 322 and 324, as described further below.

Cylinder block 204 further includes a first cylinder head engaging surface 322 positioned at a top 323 of the cylinder block. Additionally in the depicted example, the cylinder block includes a second cylinder head engaging surface 324. However in other examples, the cylinder block may include a single cylinder head engaging surface. The first and second cylinder head engaging surface (322 and 324) may be configured to couple to cylinder head 200 shown in FIG. 2. Suitable attachment apparatuses, such as bolts, may be used to couple the cylinder head 200 to the cylinder block 204 in some examples. When assembled the cylinder head 200, shown in FIG. 2, and the cylinder block 204 are attached, combustion chambers may be formed in which combustion may be implemented as previously discussed with regard to FIG. 1. Suitable attachment apparatuses (not shown) may be used to couple the cylinder head 200, shown in FIG. 2, to the cylinder block 204. Additionally, a seal (e.g., gasket) may be positioned between cylinder head 200 and the first and second cylinder head engaging surfaces (322 and 324) to seal the cylinders.

Cylinder block 204 further includes two structural frame engaging surfaces (326 and 328) configured to attach to two corresponding cylinder block sidewall engaging surfaces (330 and 332) included in the structural frame 206 discussed in greater detail herein. The two structural frame engaging surfaces (326 and 328) are positioned on opposing sides of the cylinder block 204. In the perspective view of the cylinder block assembly 202 shown in FIG. 3, the second structural frame engaging surface 328 cannot be fully viewed. However, the second structural frame engaging surface 328 as well as other components included in the other side of the cylinder block are shown in greater detail in FIG. 19. As depicted, the structural frame engaging surfaces (326 and 328) include a plurality of fastener openings 334. The fastener openings 334 may be configured to receive fasteners such as bolts when coupled to the structural frame 206 discussed in greater detail herein with regard to FIG. 4.

Cylinder block 204 further includes a first exterior sidewall 333 and a second exterior sidewall 335. The first cylinder block exterior sidewall 333 is shown in greater detail in FIG. 15. Likewise, the second cylinder block exterior sidewall 335 is shown in greater detail in FIG. 16. The first cylinder block exterior sidewall 333 extends from the first cylinder head engaging surface 322 to the first structural frame engaging surface 326 positioned between a centerline 339 of the plurality of crankshaft supports 300. Likewise, the second cylinder block exterior sidewall 335 extends from the second cylinder head engaging surface 324 to the second structural frame engaging surface 328 positioned between the centerline 339 of the plurality of crankshaft supports 300. As shown, the structural frame engaging surfaces (326 and 328) are substantially planar. However, in other examples, the structural frame engaging surface may have another geometric configuration. For example, the height of the structural frame engaging surfaces may vary.

Furthermore, the structural frame 206 includes a bottom surface 309 and two exterior sidewalls (i.e., a first structural frame exterior sidewall 336 and a second structural frame exterior sidewall 338). In some examples, the oil pan engaging surface 506, shown in FIG. 5 may be the bottom surface 309 of the structural frame 206. However, in other examples, the bottom surface 309 may include additional components. The first structural frame exterior sidewall 336 extends from the bottom surface 309 and includes the first cylinder block sidewall engaging surface 330. Likewise, the second structural frame exterior sidewall 338 extends from the bottom surface 309 and includes the second cylinder block sidewall engaging surface 332. Furthermore, the first and second structural frame exterior sidewalls (336 and 338) extend above a top of the crankshaft supports 300 when the cylinder block assembly 202 is assembled. Additionally, the bottom surface 309 is below the crankshaft supports 300. However, in other examples other configurations are possible. For example, the first and second structural frame exterior sidewalls (336 and 338) may not extend above a top of the crankshaft supports. As depicted, the structural frame has a U shape. However, in other examples, other shapes are possible. The cylinder block sidewall engaging surfaces (330 and 332) are configured to attach to the structural frame engaging surfaces (326 and 328) on the cylinder block 204 and are positioned on opposite sides of the structural frame 206. In the depicted example, the cylinder block sidewall engaging surfaces (330 and 332) form top surfaces of the structural frame. However, in other examples, other configurations are possible. The cylinder block sidewall engaging surfaces (330 and 332) include a plurality of fastener openings 340 along their lengths. As shown, the cylinder block sidewall engaging surfaces (330 and 332) are substantially planar and congruent a lateral and longitudinal plane. However, in other examples, alternate geometric configurations and orientations are possible. For example, the vertical height of the sidewall engaging surfaces may vary.

The structural frame may further include a front cover engaging surfaces (382 and 384) extending along at least a portion of the structural frame exterior sidewalls (336 and 338). A first seal 370 may be positioned between the first cylinder block sidewall engaging surface 330 and the first structural frame engaging surface 326. Likewise, a second seal 372 may be positioned between the second cylinder block sidewall engaging surface 332 and the second structural frame engaging surface 328. The first and second seals (370 and 372) may be substantially air and liquid tight. Exemplary seals include but are not limited to a gasket, an adhesive, etc.

The structural frame 206 includes an interior portion 342 adjacent to the crankshaft supports 300 when the cylinder block assembly 202 is assembled. The interior portion 342 includes fastener openings 344, shown in FIGS. 5 and 17, configured to receive suitable fasteners such as bolts. Fasteners may extend through the fastener openings 344 in the structural frame 206 as well as the attachment recesses 306 in the cylinder block 204. Specifically, corresponding fastener openings and attachment recesses may align to accept fasteners. In this way, the structural frame 206 may be coupled to the cylinder block 204 in another location, increasing the structural integrity of the cylinder block assembly 202 as well as decreasing NVH during engine operation. The interior portion 342 of the structural frame 206 is described in greater detail herein with regard to FIG. 17.

In some examples, cylinder block 204 and structural frame 206 may be constructed out of different materials. Specifically in one example, cylinder block 204 may be constructed out of a material having a greater strength to volume ratio than structural frame 206. However, in other examples, the cylinder block and structural frame may be constructed out of substantially identical materials. Exemplary materials that may be used to construct the cylinder block include a gray iron, compacted graphite iron, ductile iron, aluminum, magnesium, and/or plastic. Exemplary materials used to construct the structural frame include gray iron, compacted graphite iron, ductile iron, aluminum, magnesium, and/or plastic. In one particular example, the cylinder block may be constructed out of a compacted graphite iron and the structural frame may be constructed out of aluminum. In this way, increased structural integrity may be provided to locations in the cylinder block assembly that experience greater stress, such as the combustion chambers and surrounding areas. Moreover, the volumetric size of the cylinder block assembly may be reduced when the aforementioned combination of materials is utilized in the cylinder block assembly as opposed to a cylinder block constructed only out of aluminum. Still further, the structural frame may be constructed out of a material having a greater strength to weight ratio than the material used to construct the cylinder block, thereby enabling weight reduction of the cylinder block assembly 202.

The cylinder block assembly further includes oil pan 214 positioned vertically below the structural frame 206 and cylinder block 204. When assembled oil pump 212 may be coupled to an oil pan engaging surface 506, shown in FIG. 5, located on a bottom side of the structural frame. Moreover, the oil pump includes oil pick-up 350 positioned in the oil pan when the cylinder block assembly is assembled and an outlet port 352 configured to deliver oil to an oil passage 510, shown in FIG. 5, in the structural frame 206. In this way, the oil pump 212 may receive oil from the oil pan 214. The cylinder block assembly 202 further includes oil filter 210 and an oil filter port 550 for receiving the oil filter 210. The oil filter may be coupled to a plate body cooler 360. Plate body cooler 360 cools engine oil as it is circulated throughout the engine.

The cylinder block assembly 202 further includes oil pan 214. The oil pan includes a third structural frame engaging surface 374 having fastener openings 376 for receiving fasteners. A seal 378 may be positioned between the third structural frame engaging surface 374 and an oil pan engaging surface 506 included in the structural frame shown in FIG. 5, discussed in greater detail herein.

The structural frame 206 further includes a sensor mounting boss 213 for receiving a sensor, such as an oil pressure sensor. As shown the sensor mounting boss 213 is positioned on the first structural frame exterior sidewall 336. However, the sensor mounting boss may be positioned in another suitable location such as on the second structural frame exterior sidewall 338 in other examples.

FIG. 4 shows another perspective view of the cylinder block assembly 202 in an assembled configuration. As shown, the cylinder block 204 is attached to the structural frame 206. As shown, the first and second cylinder block sidewall engaging surface (330 and 332) on the structural frame 206 may be coupled to corresponding structural frame engaging surfaces (326 and 328). It will be appreciated that the structural frame engaging surfaces and cylinder block sidewall engaging surfaces may be correspondingly contoured to attach to on another such that the surfaces are in face sharing contact. However, in some examples seals may be positioned between the engaging surfaces as previously discussed.

Fasteners 400 extend through fastener openings (334 and 340) in both of the structural frame engaging surfaces (326 and 328) and the cylinder block sidewall engaging surfaces (330 and 332). In this way, the engaging surfaces may be secured to one another. Although FIG. 4 shows a single side of the cylinder block assembly 202 in which the engaging surfaces are attached it will be appreciated that engaging surfaces on the opposing side of the cylinder block assembly may also be coupled.

Figure 5:
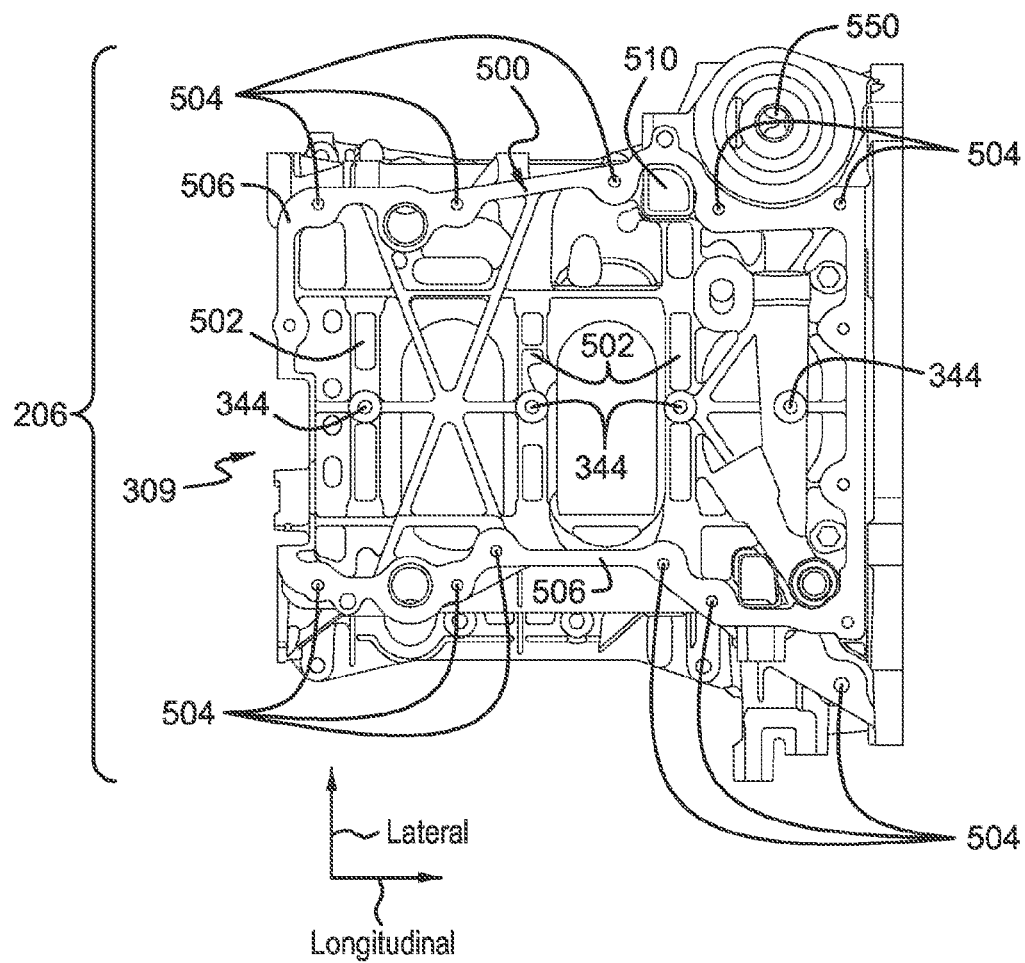
FIG. 5 shows a bottom view of a structural frame included in the cylinder block assembly shown in FIG. 3.

FIG. 5 shows the exterior portion 500 of the bottom surface 309 of the structural frame 206. As shown, the fastener openings 344 extend from the interior portion 342 of the structural frame 206, shown in FIG. 3, to the exterior portion 500 of the structural frame 206, thereby forming openings. As previously discussed fasteners such as bolts may extend through the fastener openings 344 when the cylinder block assembly is in an assembled configuration. Additionally, the fastener openings 344 may be longitudinally aligned. In the depicted example, the structural frame 206 has a ladder configuration. In the ladder configuration the structural frame 206 includes supports 502 that are laterally aligned. When the structural frame 206 has a ladder configuration it may be referred to as a ladder frame. Specifically in the ladder configuration, the supports 502 are aligned with the crankshaft supports 300, shown in FIG. 3, when the cylinder block assembly 202 is assembly, thereby providing structural support to the cylinder block 204 and crankshaft. It will be appreciated that when the cylinder block 204 is attached to the structural frame 206 in this way, the structural integrity of the cylinder block assembly may be increased and the NVH during engine operation may be reduced. However, other support alignments are possible in other examples or the supports may not be included in the structural frame. An oil pan engaging surface 506 is also shown in FIG. 5. The oil pan engaging surface includes fastener opening 504 configured to receive fasteners when attached to the oil pan 214. The structural frame 206 further includes an oil passage 510 configured to receive oil from the outlet port 352 of the oil pump 212. Structural frame 206 also includes oil filter port 550 for supplying and receiving oil from oil filter 210.

Figure 6:
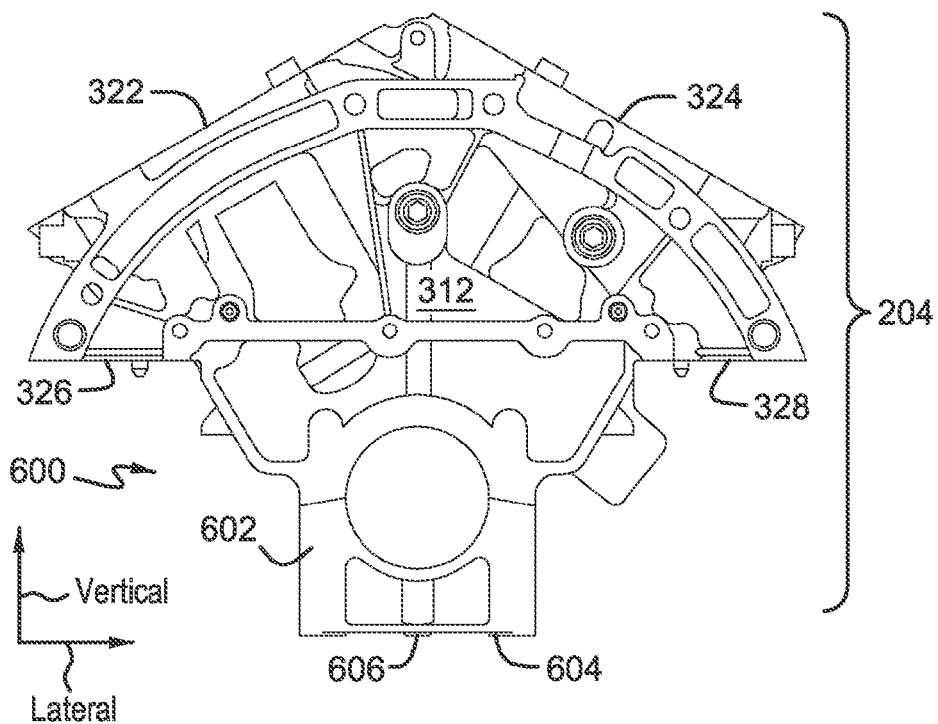
FIG. 6 shows a rear end view of the cylinder block shown in FIG. 3.
Figure 7:
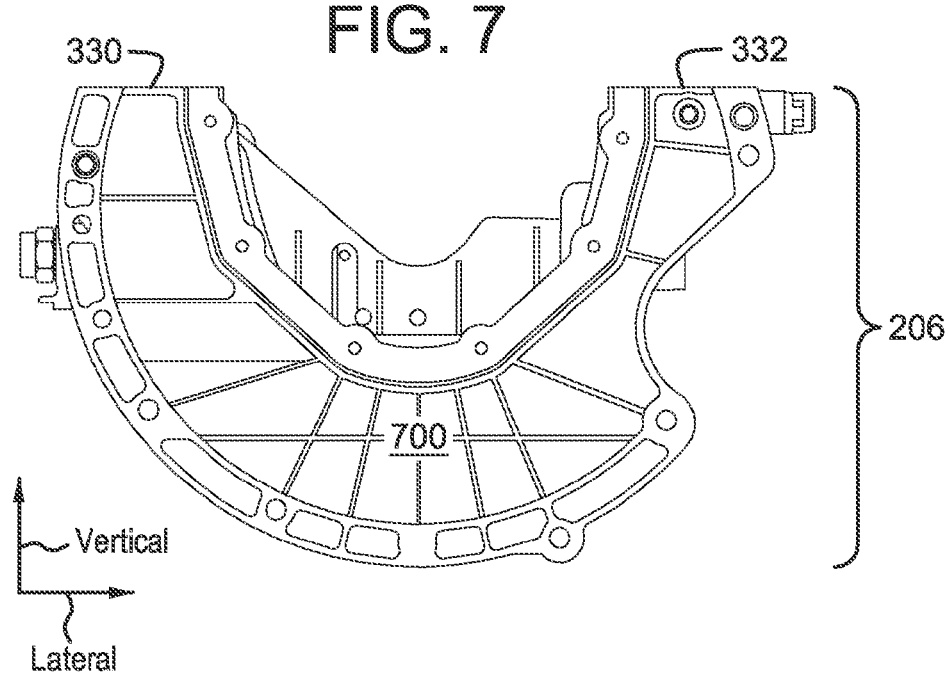
FIG. 7 shows a rear end view of the structural frame shown in FIG. 3.

FIG. 6 shows the exterior rear wall 312 of the cylinder block 204 including an outermost crankshaft support 600 and corresponding bearing cap 602. The bearing cap 602 includes a bottom surface 604 included in the plurality of bottom surfaces 308, shown in FIG. 3, and a centrally positioned attachment recess 606 included in the plurality of attachment recesses 306, shown in FIG. 3. The attachment recesses 306 may be centrally positioned with regard to the lateral edges of the bottom surfaces 308, discussed in greater detail herein with regard to FIG. 19. The cylinder head engaging surfaces (322 and 324) and the first and second structural frame engaging surfaces (326 and 328) are also shown in FIG. 6. Similarly, FIG. 7 shows a rear end 700 of the structural frame 206. The first and second cylinder block sidewall engaging surfaces (330 and 332) are also depicted in FIG. 7.

Figure 8:
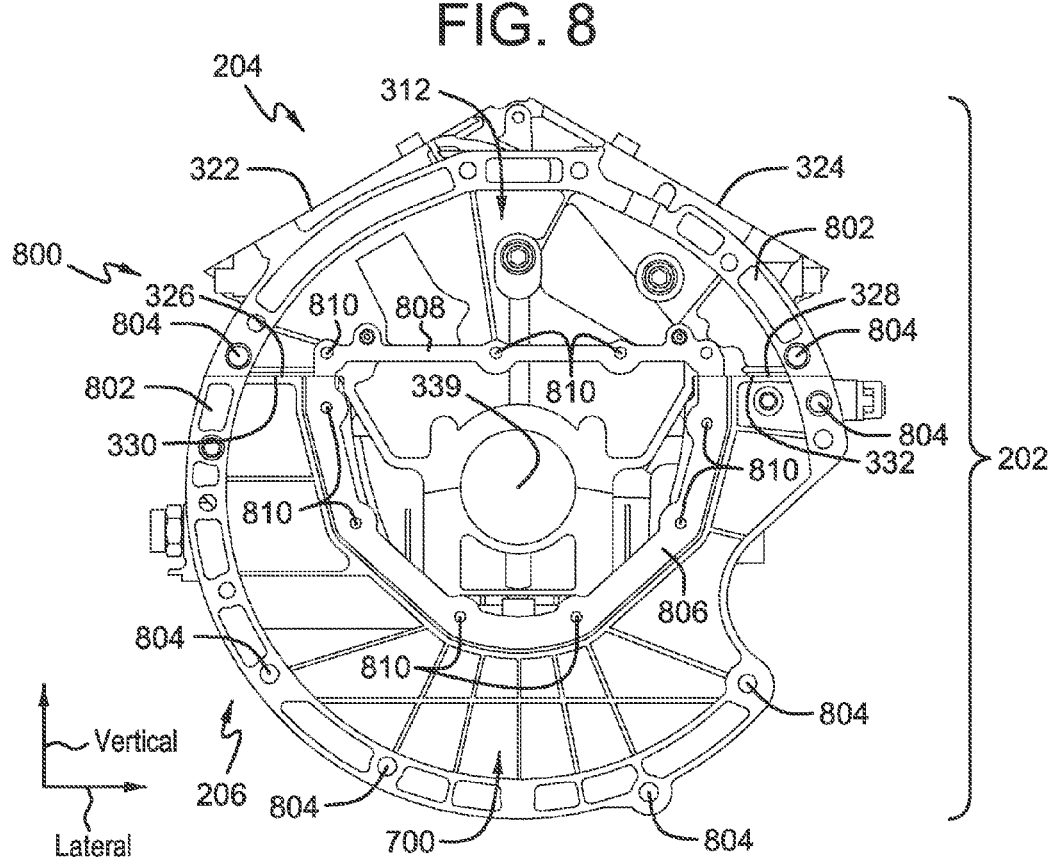
FIG. 8 shows a rear end view of the cylinder block assembly shown in FIG. 4.

FIG. 8 shows a view of the rear portion 800 of the cylinder block assembly 202 including the rear wall 312 of the cylinder block 204 and the rear end 700 of the structural frame 206 in an assembled configuration. As shown, the structural frame 206 may be coupled to the exterior rear wall 312 of the cylinder block 204. As shown, the rear end 700 of the structural frame 206 and the rear wall 312 provide a transmission bell housing engaging surface 802. The transmission bell housing engaging surface 802 may be coupled to a transmission bell housing (not shown). In this way, the transmission may be attached to the cylinder block assembly 202. Furthermore, the structural frame 206 isolates at least a portion of an interior of the engine 10 from the transmission (not shown). As shown, the transmission bell housing engaging surface is positioned near the periphery of the rear end of the cylinder block assembly 202. However, in other examples the transmission bell housing engaging surface may be positioned in another suitable location. A plurality of connection recesses 804 are included in the transmission bell housing engaging surface 802. The connection recesses may be configured to receive fasteners for connecting the transmission bell housing to the cylinder block assembly 202. Further, the connection recesses 804 are shown extending a full 360° around the centerline 339 of the crankshaft supports. It will be appreciated that in FIG. 8 the centerline 339 extends into and out of the page. As such, the rear portion of the cylinder block assembly 202 is arranged in a circular shape. The cylinder block 204 forms a top portion of the circle, and structural frame 206 forms a bottom portion of the circle. Thus, cylinder block 204 and structural frame 206 provide at least a portion of the support keeping the transmission bell housing in place when the transmission bell housing is coupled to cylinder block assembly 202. In this way, the connection between the transmission and the cylinder block assembly may be strengthened thereby reducing NVH within the vehicle.

Furthermore, the structural frame 206 may include a rear cover engaging surface 806 for a rear main crankshaft seal housing. Likewise, the cylinder block 204 may include a rear cover engaging surface 808 for the rear main crankshaft seal housing. In this way, the crankshaft may be substantially sealed. Both the engaging surfaces, 806 and 808, may include fastener openings 810 for receiving fasteners.

FIG. 8 also shows the cylinder head engaging surfaces (322 and 324), the first structural frame engaging surface 326 attached to the first cylinder block sidewall engaging surface 330, and the second structural frame engaging surface 328 attached to the second cylinder block sidewall engaging surface 332.

Figure 9:
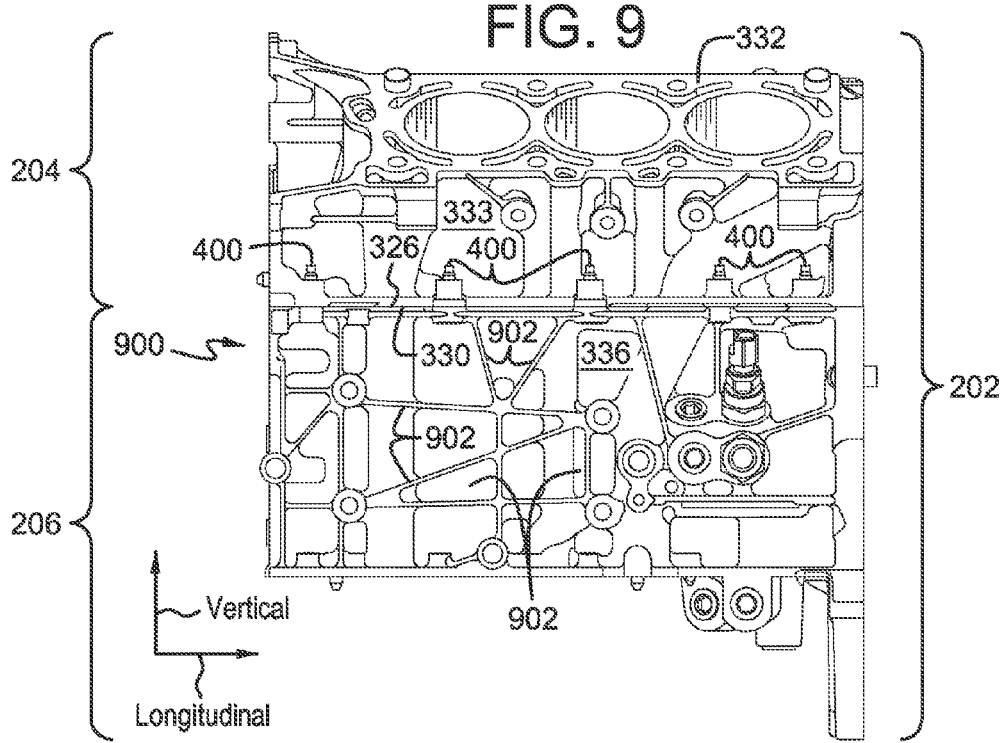
FIG. 9 shows a left side view of the cylinder block assembly shown in FIG. 4.

FIGS. 9 and 10 show side views of the laterally opposing sidewalls of the cylinder block assembly 202. Specifically FIG. 9 shows a first assembly sidewall 900 of the cylinder block assembly 202 and FIG. 10 shows a second assembly sidewall 1000 of the cylinder block assembly 202. As shown, a portion of the cylinder block 204 and the structural frame 206 included in the cylinder block assembly 202 form the assembly sidewalls (900 and 1000). Specifically, the first assembly sidewall 900 includes the first cylinder block exterior sidewall 333 and the first structural frame exterior sidewall 336. Furthermore, the first structural frame exterior sidewall 336 included in the sidewall 900 includes stiffening webbing 902. Moreover, in the depicted example, the first structural frame exterior sidewall 336 provides more than half a vertical length of the first assembly sidewall 900. However in other examples, other configurations are possible. Likewise, as shown in FIG. 10, the second assembly sidewall 1000 includes the cylinder block second exterior sidewall 335 and the structural frame second exterior sidewall 338. Additionally, the structural frame second exterior sidewall 338 included in the second assembly sidewall 1000 includes stiffening webbing 1002. The stiffening webbing strengthens the walls without having to increase the wall strength throughout cylinder block assembly 202 and specifically the structural frame 206. As such, stiffening webbing (902 and 1002) strengthens the structural frame 206 of the cylinder block assembly 202 without adding significant weight to the structural frame 206. Further in the depicted example, the structural frame second exterior sidewall 338 provides more than half a vertical length of the second assembly sidewall 1000. However in other examples, other configurations are possible.

FIG. 9 also shows the first structural frame engaging surface 326 coupled to the first cylinder block sidewall engaging surface 330. As shown, fasteners 400 may extend through the first structural frame engaging surface and the first cylinder block sidewall engaging surface to attach the cylinder block 204 to the structural frame 206. Cylinder head engaging surface 322 is also depicted in FIG. 9.

FIG. 10 also shows the second structural frame engaging surface 328 coupled to the second cylinder block sidewall engaging surface 332. As shown, fasteners 400 may extend through the second structural frame engaging surface and the second cylinder block sidewall engaging surface to attach the cylinder block 204 to the structural frame 206.

FIG. 11 shows a view of the exterior front wall 310 of the cylinder block 204. As previously discussed, the exterior front wall 310 includes an outermost crankshaft support 1100 and corresponding bearing cap 1102. The bearing cap 1102 may include a bottom surface 1104 included in the plurality of bottom surfaces 308, shown in FIG. 3. Furthermore, the bottom surface 1104 may include a centrally positioned attachment recess 1106 included in the plurality of attachment recesses 306, shown in FIG. 3. The plurality of attachment recesses 306 are positioned below the centerline 339. The attachment recesses 306 are discussed in greater detail herein with regard to FIGS. 13 and 19. Continuing with FIG. 11, the cylinder head engaging surfaces (322 and 324) and the first and second structural frame engaging surface (326 and 328) are also shown in FIG. 11. FIG. 12 shows a detailed front side 1200 of the structural frame 206. The front side 1200 of the structural frame 206 may include a front partition 1202. As shown, the front partition 1202 couples the first and second structural frame exterior side walls (336 and 338). The cylinder head engaging surfaces (322 and 324) and the first and second cylinder block sidewall engaging surfaces (330 and 332) are also shown in FIG. 12.

Referring to FIG. 13, it shows a cut-away view of the cylinder block assembly 202. Cutting plane 450, shown in FIG. 4, defines the cross-section shown in FIG. 13. One crankshaft support 1300 included in the plurality of crankshaft supports 300, shown in FIG. 3, is shown. The centerline 339 extends into and out of the page. As shown, a fastener 1302 included in the plurality of fasteners 400, shown in FIG. 4, extends through the fastener opening 1304 included in the plurality of fastener openings 334, shown in FIG. 3, in the first structural frame engaging surface 326 and fastener opening 1305 included in the plurality of fastener openings 340, shown in FIG. 3, in the first cylinder block sidewall engaging surface 330. The fastener 1302 as well as the other fasteners 400, shown in FIG. 4, couple the structural frame 206 to the cylinder block 204 vertically above the centerline 339 of the crankshaft relative to the bottom of the cylinder block 204 and the structural frame 206. In this way, the first and second structural frame exterior sidewalls (336 and 338) of the structural frame 206 extend above the centerline 339 of the crankshaft supports 300. Therefore, the first and second cylinder block exterior sidewalls (333 and 335) end above the centerline 339 of the crankshaft supports 300. Likewise, the first and second structural frame exterior sidewalls (336 and 338) end above the centerline 339 of the crankshaft supports 300.

When the cylinder block is coupled to the structural frame above the centerline of the crankshaft supports, the cylinder block assembly may be provided with increased structural integrity when compared to other cylinder block designs that connect the cylinder block to the frame vertically at or below the centerline of the crankshaft supports. Moreover, NVH may be decreased within the engine when this type of configuration is utilized due to the increased structural integrity of the cylinder block assembly. Further, extending the first and second structural frame exterior sidewalls (336 and 338) above the centerline 339 of the crankshaft supports allows the structural frame 206 to be constructed of a lower strength to volume material so that engine weight may be reduced.

Additionally, the bearing cap 1306 of crankshaft support 1300 includes a centrally positioned attachment recess 1308. In the depicted embodiment the centrally positioned attachment recess 1308 is positioned at the midpoint between the lateral edges 1309 of the bottom surface of the bearing cap 1306. Correspondingly, the structural frame 206 includes a centrally positioned fastener opening 1310 included in the plurality of fastener openings 344. The fastener opening 1310 and the attachment recess 1308 may be aligned when the cylinder block assembly 202 is assembled to accept a fastener 1312. As depicted, when the cylinder block assembly is assembled the fastener 1312 extends through the fastener opening 1310 and the attachment recess 1308. In this way, the structural frame 206 may be coupled to the cylinder block in another location, further increasing the reinforcement provided by the structural frame 206. It will be appreciated that the interface between the fastener opening 1310 and the attachment recess 1308 is below the centerline 339. Although a single bearing cap 1306, attachment recess 1308, fastener opening 1310, and fastener 1312 are shown in FIG. 13, it will be appreciated that each bearing cap in the cylinder block may include a similar attachment recess, fastener opening, and fastener extending therethrough.

FIG. 13 also shows a vertical centerline 1360 of the cylinder block assembly 202. The vertical centerline bisects the cylinder block assembly 202 into two halves (or sides), one corresponding to the first cylinder bank and the other corresponding to the second cylinder bank of the V-engine. The valley 320 is arranged at the top of the cylinder block and may be centered along the vertical centerline 1360, between the cylinders of the two opposing cylinder banks.

As shown in FIG. 13, the first cylinder head engaging surface 322 and the second cylinder head engaging surface 324 are each angled downward and away from a top surface of the cylinder block positioned above the valley 320, where angling of the first and second cylinder head engaging surfaces is relative to the vertical centerline 1360. For example, each of the first and second cylinder head engaging surfaces angles downward from the top of the cylinder block as the surface extends away from the vertical centerline 1360. Said another way, each of the first and second cylinder head engaging surfaces are angled downward and away from a top, outer surface of the cylinder block at a peak positioned along the vertical centerline 1360 and between the two cylinder block engaging surfaces. The first and second cylinder head engaging surfaces are also angled relative to the centerline 339. The first structural frame engaging surface 326 and the second structural frame engaging surface 328 are positioned on opposing sides of the cylinder block assembly 202 relative to the vertical centerline 1360. Further, the first and second structural frame engaging surfaces 326 and 328 are arranged perpendicular to the vertical centerline 1360 and parallel to the centerline 339. Said yet another way, the first and second cylinder block engaging surfaces are angled relative to ground or a bottom surface on which the cylinder block assembly sits, while the first and second structural frame engaging surfaces are not angled relative to the ground or bottom surface. The first cylinder block exterior sidewall 333 and the second cylinder block exterior sidewall 335 are also angled and arranged on opposing sides of the cylinder block assembly 202 relative to the vertical centerline 1360. The first cylinder block exterior sidewall 333 is angled outward relative to the vertical centerline 1360, from the first structural frame engaging surface 326 to the first cylinder head engaging surface 322 and the second cylinder block exterior sidewall 335 is angled outward relative to the vertical centerline 1360, from the second structural frame engaging surface 328 to the second cylinder head engaging surface 324. In one example, at least a portion of the first and second structural frame exterior sidewalls (336 and 338) are not angled relative to the vertical centerline 1360. Further, the first and second cylinder block engaging surfaces (330 and 332) are arranged perpendicular to the vertical centerline 1360 and parallel to the centerline 339. Said yet another way, both of the first and second cylinder block engaging surfaces and both of the first and second cylinder block exterior sidewalls are angled relative to the first and second structural frame engaging surfaces and the first and second cylinder block engaging surfaces.

As also shown in FIG. 13, the two cylinder block exterior sidewalls and two cylinder head engaging surfaces are oppositely angled relative to the vertical centerline 1360. For example, from the vertical centerline 1360, the first cylinder head engaging surface 322 is angled downward and away from the vertical centerline and the first cylinder block exterior sidewall is angled upward and away from the vertical centerline.

FIG. 13 also shows the centerlines 1350 of the cylinders are positioned at a non-straight angle 1352 with respect to one another. However, in other examples other cylinder arrangements are possible. Fasteners 1307 may be used to attach a lower portion of the crankshaft support 1300 to an upper portion of the crankshaft support 1300 after it is cracked or otherwise divided. However, in other examples the cylinder block assembly 202 may not include fasteners 1307. Example fasteners include bolts, screws, or other suitable attachment apparatuses.

The second cylinder block sidewall engaging surface 332 and the second structural frame engaging surface 328 are also shown in FIG. 13. It will be appreciated that the second cylinder block sidewall engaging surface and the second structural frame engaging surface may include similar fasteners and fastener opening to fastener 1302 and fastener opening 1304 and 1305 shown in FIG. 13.

Figure 14:
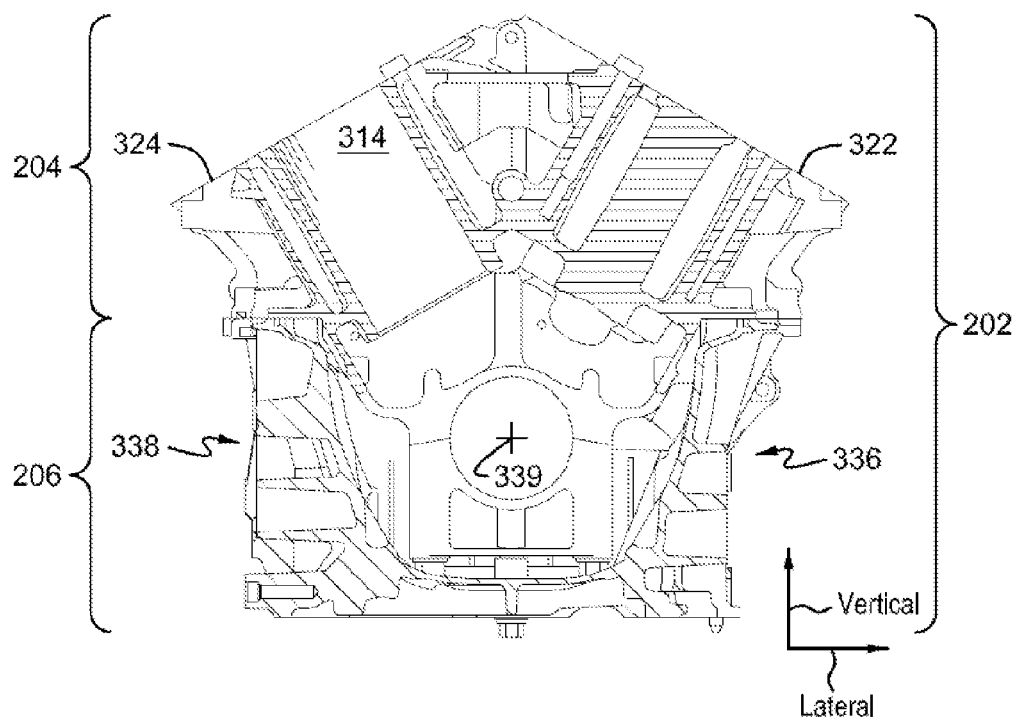

Referring to FIG. 14, it shows another cut-away view of cylinder block assembly 202. Cutting plane 452, shown in FIG. 4, defines the cross-section shown in FIG. 14. The cut-away show that the first and second structural frame exterior sidewalls (336 and 338) of the structural frame 206 as well as the first and second cylinder block exterior sidewalls (333 and 335) of the cylinder block 204 may vary in thickness. FIG. 14 also shows the cylinder head engaging surfaces (322 and 324).

Figure 15:
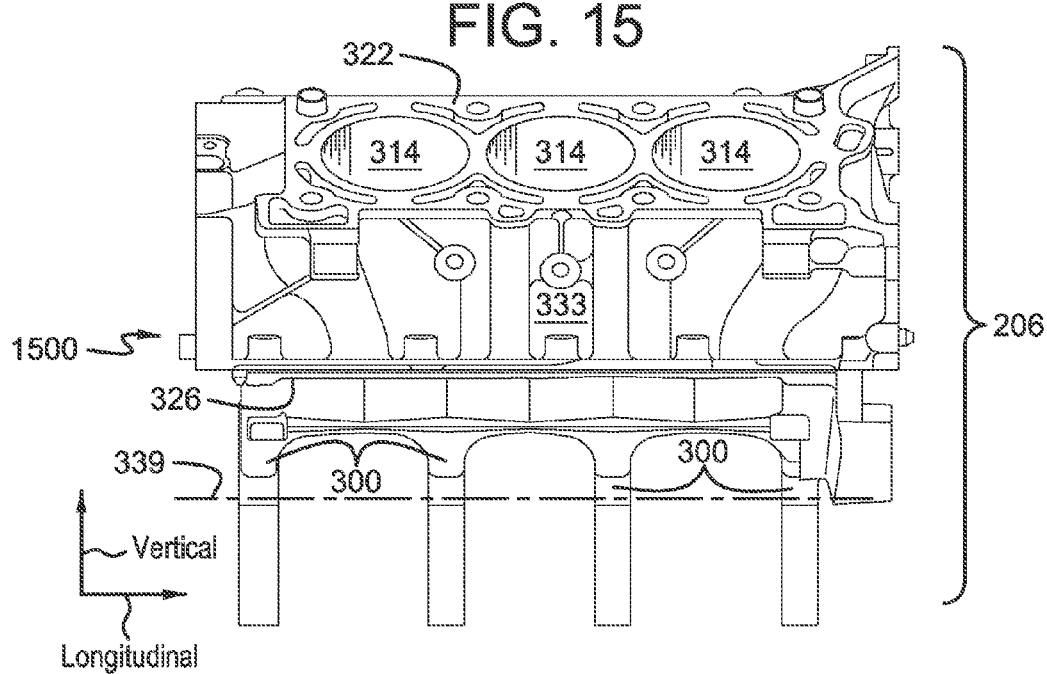
FIGS. 15 and 16 show side views of the cylinder block shown in FIG. 3.
Figure 16:
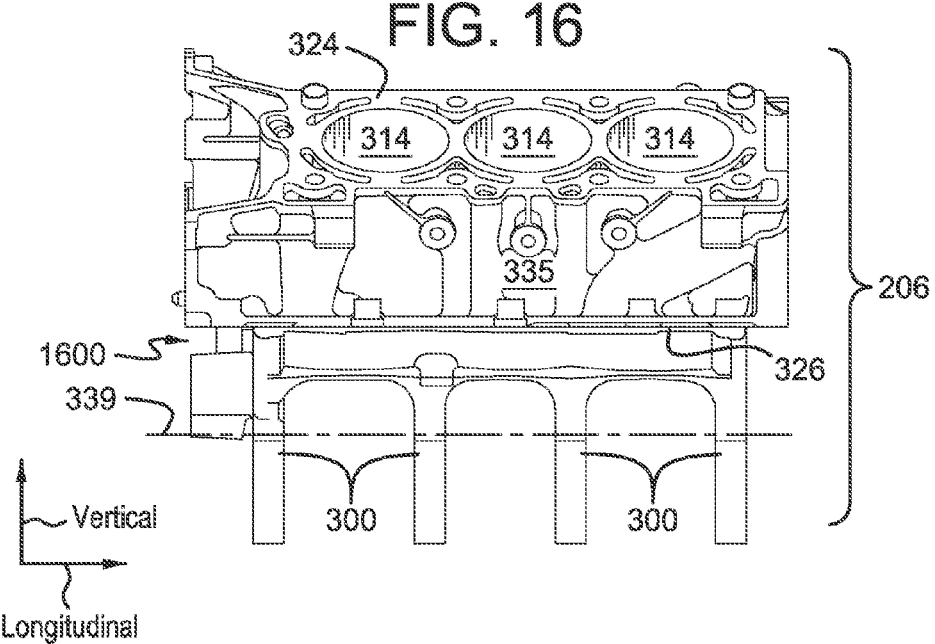

FIG. 15 shows a side view of the structural frame 206. As shown, the crankshaft supports 300 extend in a vertical direction. However, in other examples the crankshaft supports may have an alternate orientation and/or geometry. The cylinder head engaging surface 322, the first cylinder block exterior sidewall 333, the structural frame engaging surface 326, and the centerline 339 of the plurality of crankshaft supports 300 are also shown in FIG. 15. As previously discussed, the structural frame engaging surface 326 is positioned vertically above the centerline 339. FIG. 16 shows another side view of the structural frame 206. FIG. 16 additionally shows the cylinder head engaging surface 324, the second cylinder block exterior sidewall 335, the second structural frame engaging surface 328, and the centerline 339.

FIG. 17 shows a top view if the interior of the structural frame 206. As shown, supports 1700 may laterally extend across the structural frame 206. The supports are laterally and longitudinally aligned with the bearing caps to provide increased support to the cylinder block, thereby increasing the cylinder block assembly's strength and reducing NVH during engine operation. As shown, the fastener openings 344 are located at the midpoints of the supports 1700 and each support 1700 includes a single fastener opening. However, in other examples, the supports 1700 may include a different number of fastener opening and/or the fastener opening may be positioned in other locations. Additionally, the cylinder block sidewall engaging surfaces (330 and 332) and the fastener openings 340 included in the cylinder block sidewall engaging surfaces (330 and 332) are shown. The first seal 370 and the second seal 372 are also shown in FIG. 17.

Figure 18:
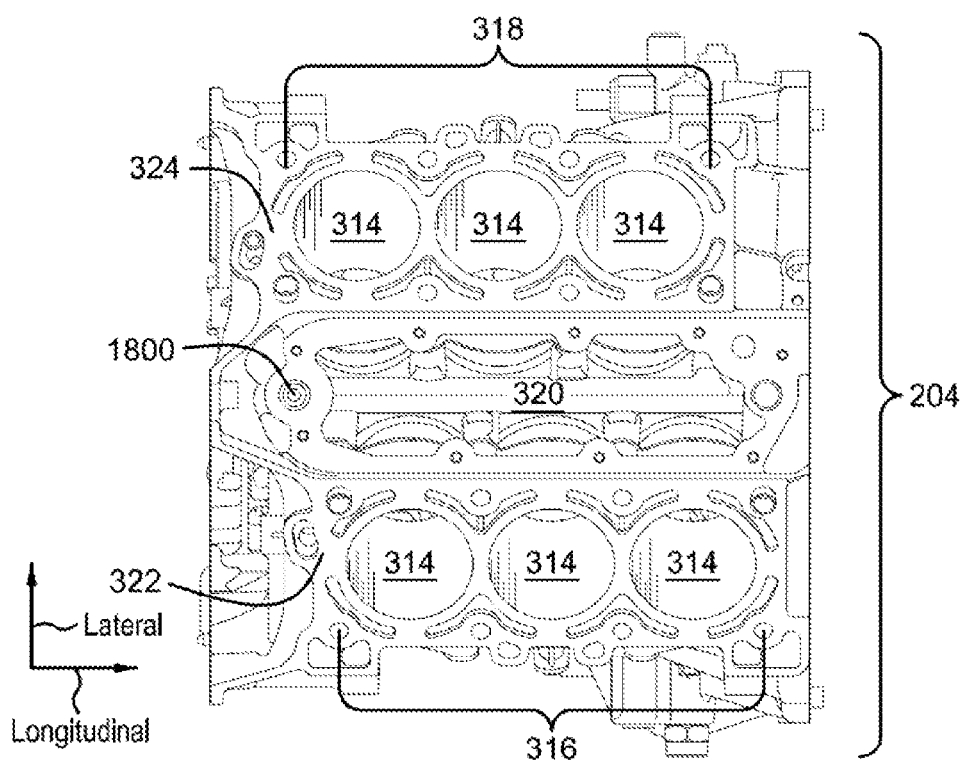
FIG. 18 shows a top view of the cylinder block assembly shown in FIG. 4.

FIG. 18 shows a top view of the cylinder block 204. Cylinders 314 are arranged in two groups of three cylinders. However, in alternative examples, cylinder block 204 may be comprised of a single cylinder, two groups of four cylinders, two groups of two cylinders, or two groups of one cylinder. The groups of cylinder may be referred to as cylinder banks. As shown, the two groups of three cylinders are offset from each other in a longitudinal direction. In this example, cylinder block 204 is configured for over head camshafts. However, in alternative examples, cylinder block 204 may be configured for a push-rod configuration. Additionally, the valley 320 between the cylinder banks is shown. An oil passage 1800 may be fluidly coupled to the cooler 260, shown in FIGS. 3 and 4, positioned in the valley 320. In this way, oil passage 1800 may be positioned to receive oil from cooler 260. Specifically, oil passage 1800 may receive oil from cooler 260. Oil passage 1800 may be fluidly coupled to an oil gallery included in the structural frame 206 and/or an oil gallery included in the cylinder block 204. The cylinder head engaging surfaces (322 and 324) are also shown in FIG. 18.

Figure 19:
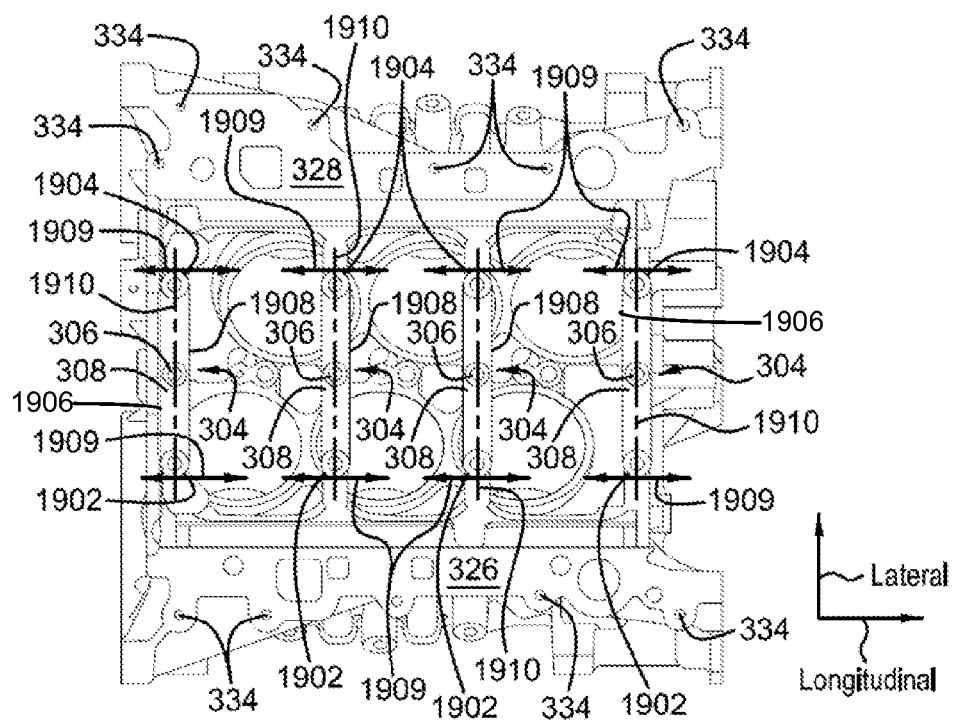
FIG. 19 show a bottom view of the cylinder block shown in FIG. 3.

FIG. 19 shows a view of the bottom 1900 of the cylinder block 204. The bottom surfaces 308 of the bearing caps 304 are depicted. The bottom surfaces 308 are depicted as having a varied vertical profile. However, in other examples the bottoms surfaces 308 may be substantially planar. The bottom surfaces 308 may each include a first lateral edge 1902 and a second lateral edge 1904 positioned on opposing sides of each bottom surface. The lateral edges 1902 and 1904 are curved in the depicted embodiment. However, in other examples the lateral edges 1902 and 1904 may be substantially straight. Likewise, each bottom surface may include a first longitudinal edge 1906 and a second longitudinal edge 1908 positioned on opposing sides of the bottom surface. The longitudinal edges 1906 and 1908 are substantially straight in the depicted embodiment. However, in other examples the longitudinal edges may not be straight.

The structural frame attachment recesses 306 may be positioned at the midpoint between the first and second lateral edges (1902 and 1904). Additionally, the structural frame attachment recesses 306 may be longitudinally aligned. Furthermore, the structural frame attachment recesses 306 may partially extend into the bearing cap 304. Specifically, the structural frame attachment recesses 306 vertically extend into the bearing caps 304 in the depicted embodiment. Thus the structural frame attachment recesses 306 may be vertically oriented. However, other alignments are possible in other examples.

When each bearing cap includes a single centrally positioned attachment recess for coupling the cylinder block 204 to the structural frame 206 the lateral profile may be reduced when compared to a cylinder block assembly having the attachment recesses positioned near the lateral periphery of the bearing caps. Furthermore, the manufacturing and assembly of the cylinder block assembly 202 may be simplified when each bearing cap 304 includes a single centrally positioned structural frame attachment recess 306. As a result, the cost of the cylinder block assembly 202 is reduced. Furthermore, the centrally positioned attachment recess may provide increased structural integrity in the cylinder block assembly 202 when compared to a cylinder block assembly including a cylinder block having attachment recess positioned near the lateral periphery of the bearing caps. The centrally positioned attachment recess may also provide a reduction in NVH within the engine.

As shown, tangent lines 1909 to the lateral edges (1902 and 1904) are perpendicular to a lateral axis 1910 spanning the bottom surfaces 308. Lateral axes 1910 span each bearing cap 304. The tangent lines 1909 are parallel to the centerline 339 in the depicted embodiment. The tangent lines 1909 are also perpendicular to the lateral axes 1910. However, the bearing caps 304 may have another configuration in other examples.

In some examples, additional structural frame attachment recesses may be positioned proximate to the lateral periphery of the bottom surfaces 308 of the bearing caps 304. As previously discussed, the cylinder block 204 includes a first and second structural frame engaging surface (326 and 328) having fastener opening 334 configured to receive fasteners for coupling the cylinder block 204 to the structural frame 206, shown in FIG. 3.

The cylinder block assembly 202 and engine 10, shown in FIGS. 2-19, provide for a cylinder block assembly including a cylinder block and at least a cylinder with a crankshaft support at a bottom side of the cylinder block, the crankshaft support including a bottom surface having a structural frame attachment recess partially extending into the crankshaft support and substantially centrally positioned with regard to first and second lateral edges of the bottom surface.

The cylinder block assembly 202, shown in FIGS. 2-19, also provides for a cylinder block assembly further including a structural frame engaging surface positioned above a centerline of the crankshaft support and the crankshaft support including a crankshaft supporting surface. The cylinder block assembly 202, shown in FIGS. 2-19, also provides for a cylinder block assembly wherein lines tangent to the lateral edges are parallel with the centerline.

The cylinder block assembly 202, shown in FIGS. 2-19, also provides for a cylinder block assembly wherein each structural frame attachment recess extends vertically into the crankshaft support and is arranged perpendicular to the centerline. The cylinder block assembly 202, shown in FIGS. 2-19, also provides for a cylinder block assembly wherein each structural frame attachment recess extends vertically into the crankshaft support.

The cylinder block assembly 202, shown in FIGS. 2-19, also provides for a cylinder block assembly wherein the cylinder block is formed as a one piece engine cylinder block, where a bearing cap is included in the crankshaft support, and where the bearing cap is subsequently divided from the cylinder block after the cylinder block is formed, the bearing cap including only a single centrally positioned structural frame attachment recess.

In one example, the cylinder block assembly 202, shown in FIGS. 2-19, also provides for a cylinder block assembly wherein the cylinder block includes a group of crankshaft supports and where the crankshaft support is included in the group of crankshaft supports, the group of crankshaft supports including a first crankshaft support positioned at an exterior front wall of the cylinder block and a second crankshaft support positioned at an exterior rear wall of the cylinder block.

In some examples, the cylinder block assembly 202, shown in FIGS. 2-19, also provides for a cylinder block assembly further comprising a cylinder head engaging surface at a top of the cylinder block, and first and second cylinder block exterior sidewalls, the first cylinder block exterior sidewall extending from the cylinder head engaging surface to a first structural frame engaging surface, the first structural frame engaging surface positioned above the centerline of the crankshaft support and the second cylinder block exterior sidewall extending from the cylinder head engaging surface to a second structural frame engaging surface positioned above the centerline of the crankshaft support. In this way, the strength of the block may be maintained while weight of the block may be reduced.

The cylinder block assembly 202, shown in FIGS. 2-19, also provides for a cylinder block assembly wherein the cylinder head engaging surface and the structural frame attachment recess are positioned on opposing sides of the cylinder block.

The cylinder block assembly 202, shown in FIGS. 2-19, also provides for a cylinder block assembly wherein the cylinder block is formed as a one piece engine cylinder block, and where a bearing cap is subsequently divided from the cylinder block, the bearing cap including the structural frame attachment recess. In this way, the strength of the cylinder block can be improved.

The cylinder block assembly 202, shown in FIGS. 2-19, also provides for a cylinder block assembly further including a structural frame coupled to the cylinder block, the structural frame including supports extending from a first structural frame exterior sidewall to a second structural frame exterior sidewall, each support including a fastener opening, and a plurality of fasteners, each fastener extending through a fastener opening and corresponding attachment recess. Thus, a structural frame increases the strength of the cylinder block.

The cylinder block assembly 202, shown in FIGS. 2-19, also provides for a cylinder block assembly wherein the structural frame is constructed out of aluminum. The cylinder block assembly 202 shown in FIGS. 2-19 also provides for a cylinder block assembly wherein the structural frame includes first and second cylinder block sidewall engaging surfaces that extend above a centerline of the crankshaft support. In this way, the structural frame and cylinder block may be comprised of different materials.

The cylinder block assembly 202, shown in FIGS. 2-19, also provides for a cylinder block assembly including a cylinder block including two or more cylinders, at least two crankshaft supports at a bottom of the cylinder block, each crankshaft support including a bottom surface with a single structural frame attachment feature that is centrally positioned with regard to first and second lateral edges of the bottom surface and a structural frame coupled to the cylinder block at the single structural frame attachment feature of each crankshaft support. Thus, the centrally located recess can increase the cylinder block strength by helping to tie the sides of the block together.

The cylinder block assembly 202, shown in FIGS. 2-19, also provides for a cylinder block assembly wherein the cylinder block is constructed out of a compacted graphite iron. The cylinder block assembly 202, shown in FIGS. 2-19, also provides for a cylinder block assembly wherein each crankshaft support includes only a single attachment feature, and where the single attachment feature is a recess. The cylinder block assembly 202, shown in FIGS. 2-19, also provides for a cylinder block assembly wherein the cylinder block includes a transmission bell housing engaging surface.

The cylinder block assembly 202, shown in FIGS. 2-19, also provides for a cylinder block assembly including a cylinder block including two or more cylinders arranged in a non-straight angle, two crankshaft supports at a bottom of the cylinder block, each crankshaft support including a bottom surface having a structural frame attachment recess partially extending into the crankshaft support and centrally positioned with regard to first and second lateral edges of the bottom surface, a cylinder head engaging surface at a top of the cylinder block, and first and second cylinder block exterior sidewalls, the first cylinder block exterior sidewall extending from the cylinder head engaging surface to a first structural frame engaging surface positioned above a centerline of the two crankshaft supports, a structural frame including lateral supports extending from a first structural frame exterior sidewall to a second structural frame exterior sidewall, each lateral support including a fastener opening, and each structural frame exterior sidewall including a cylinder block exterior sidewall engaging surface positioned above the centerline and coupled to one of the first and second exterior sidewalls of the cylinder block.

In another example, the cylinder block assembly 202 shown in FIGS. 2-19 also provides for a cylinder block assembly further including a plurality of fasteners, each fastener extending through a fastener opening in the structural frame and a corresponding structural frame attachment recess. The cylinder block assembly 202 shown in FIGS. 2-19 also provides for a cylinder block assembly wherein the cylinder block is constructed out of a material having a greater strength to volume ratio than the structural frame.

It will be appreciated that the configurations and/or approaches described herein are exemplary in nature, and that these specific examples or examples are not to be considered in a limiting sense, because numerous variations are possible. The subject matter of the present disclosure includes all novel and nonobvious combinations and subcombinations of the various features, functions, acts, and/or properties disclosed herein, as well as any and all equivalents thereof.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. A cylinder block assembly for a V-engine, comprising:
a cylinder block including a plurality of cylinders divided into a first cylinder bank and a second cylinder bank, a valley positioned between the first and second cylinder banks, and a plurality of crankshaft supports; and
a structural frame including an interior surface directly coupled to bottom surfaces of the plurality of crankshaft supports and two top surfaces of the structural frame arranged above the interior surface and on opposing sides of the cylinder block assembly, where each top surface is directly coupled to the cylinder block above a top of the plurality of crankshaft supports.

2. The assembly of claim 1, wherein each crankshaft support of the plurality of crankshaft supports includes a bottom surface and the interior surface of the structural frame is coupled to each bottom surface of each crankshaft support via a fastener and wherein the interior surface of the structural frame is arranged parallel to each bottom surface of each crankshaft support.

3. The assembly of claim 1, wherein the cylinder block further comprises a first cylinder head engaging surface of the first cylinder bank and a second cylinder head engaging surface of the second cylinder bank, where the first cylinder head engaging surface and the second cylinder head engaging surface are each angled downward and away from a top surface of the cylinder block positioned above the valley, where angling of the first and second cylinder head engaging surfaces is relative to a vertical centerline of the cylinder block assembly and wherein the interior surface of the structural frame is arranged below the bottom surfaces of the plurality of crankshaft supports.

4. The assembly of claim 3, wherein the cylinder block further comprises a first structural frame engaging surface and a second structural frame engaging surface positioned on opposing sides of the cylinder block assembly relative to the vertical centerline and wherein the first and second structural frame engaging surfaces are arranged perpendicular to the vertical centerline.

5. The assembly of claim 4, wherein the cylinder block further comprises angled, first and second exterior sidewalls arranged on opposing sides of the cylinder block assembly relative to the vertical centerline, wherein the first exterior sidewall extends between the first structural frame engaging surface and the first cylinder head engaging surface and the second exterior sidewall extends between the second structural frame engaging surface and the second cylinder head engaging surface.

6. The assembly of claim 5, wherein the first exterior sidewall is angled outward relative to the vertical centerline, from the first structural frame engaging surface to the first cylinder head engaging surface, and wherein the second exterior sidewall is angled outward relative to the vertical centerline, from the second structural frame engaging surface to the second cylinder head engaging surface.

7. The assembly of claim 3, wherein the two top surfaces of the structural frame are arranged perpendicular to the vertical centerline.

8. The assembly of claim 1, wherein the structural frame further comprises two structural frame exterior sidewalls, where each of the two structural frame exterior sidewalls extends between a bottom surface of the structural frame and one of the two top surfaces, and wherein the interior surface of the structural frame is arranged inward of the two structural frame exterior sidewalls relative to a vertical centerline of the cylinder block assembly and the interior surface intersects the vertical centerline.

9. The assembly of claim 1, further comprising an oil cooler positioned in the valley, where the oil cooler extends into an interior of the valley from a top, outer surface of the cylinder block.

10. The assembly of claim 9, further comprising a gasket positioned between the oil cooler and the cylinder block, where the gasket is positioned on the top, outer surface of the cylinder block.

11. A cylinder block assembly for a V-engine, comprising:
a cylinder block including a plurality of cylinders divided into a first cylinder bank and a second cylinder bank, where a valley separates the first cylinder bank from the second cylinder bank, at least one crankshaft support, two structural frame engaging surfaces positioned above a centerline of a crankshaft supported by the at least one crankshaft support, and two cylinder head engaging surfaces, where each of the two structural frame engaging surfaces and each of the two cylinder head engaging surfaces are positioned on opposing sides of the cylinder block; and
a structural frame including an interior surface directly coupled to a bottom of the at least one crankshaft support, and two cylinder block engaging surfaces, each directly coupled to a respective one of the two structural frame engaging surfaces.

12. The cylinder block assembly of claim 11, wherein the two cylinder head engaging surfaces are angled relative to the centerline of the crankshaft and relative to a vertical centerline of the cylinder block assembly, wherein the two structural frame engaging surfaces are spaced away from one another and arranged perpendicular to the vertical centerline, and wherein the interior surface of the structural frame is arranged parallel to the bottom of the at least one crankshaft support.

13. The cylinder block assembly of claim 12, further comprising two cylinder block exterior sidewalls, each extending between a respective one of the two structural frame engaging surfaces and a respective one of the two cylinder head engaging surfaces, where the two cylinder block exterior sidewalls and two cylinder head engaging surfaces are oppositely angled relative to the vertical centerline, and wherein the interior surface is positioned below the bottom of the at least one crankshaft support and intersects the vertical centerline.

14. The cylinder block assembly of claim 11, further comprising an oil cooler and oil passage positioned within the valley, where the oil passage is fluidly coupled to the oil cooler and the oil passage is fluidly coupled to an oil gallery included in one or more of the structural frame and cylinder block, and wherein the two cylinder block engaging surfaces are positioned above a top of the at least one crankshaft support.

15. A cylinder block assembly for a V-engine, comprising:
a cylinder block including a first cylinder bank and a second cylinder bank, a valley positioned between the first and second cylinder banks, at least two crankshaft supports, each having a bottom surface, two structural frame engaging surfaces positioned on opposing sides of the valley and above a top of the crankshaft supports, and two cylinder head engaging surfaces positioned on opposing sides of the valley and angled, with respect to a vertical centerline of the cylinder block assembly, downward from a top of the valley toward the two structural frame engaging surfaces;
a structural frame including an interior surface directly coupled to the bottom surface of each crankshaft support and two cylinder block engaging surfaces, each directly coupled to a respective one of the two structural frame engaging surfaces, where the interior surface and the bottom surface of each crankshaft support are arranged parallel to one another and perpendicular to the vertical centerline; and
an oil cooler positioned in the valley.

16. The cylinder block assembly of claim 15, wherein the vertical centerline is perpendicular to a centerline of a crankshaft which is supported by the at least two crankshaft supports, wherein the two structural frame engaging surfaces are parallel to the centerline of the crankshaft and perpendicular to the vertical centerline, and wherein the interior surface is positioned below the bottom of each crankshaft support and intersects the vertical centerline.

17. The cylinder block assembly of claim 16, wherein the cylinder block includes two exterior sidewalls that are angled relative to the vertical centerline and the centerline of the crankshaft and wherein each of the two exterior sidewalls extends between one of the two structural frame engaging surfaces and one of the two cylinder head engaging surfaces.

18. The cylinder block assembly of claim 15, wherein the oil cooler extends into an interior of the valley from a top, outer surface of the cylinder block and wherein the bottom surface of each crankshaft support is directly coupled to the interior surface of the structural frame via a fastener.

19. The cylinder block assembly of claim 18, further comprising a gasket positioned between the oil cooler and the cylinder block, where the gasket is positioned on the top, outer surface of the cylinder block at a peak positioned between the two cylinder block engaging surfaces which are each angled downward and away from the peak.

20. The cylinder block assembly of claim 15, further comprising an oil pan coupled to a bottom surface of the structural frame and wherein the interior surface of the structural frame is positioned between the oil pan and the bottom surface of each crankshaft support, in a direction of the vertical centerline.

\* \* \* \* \*